United States Patent
Balmakhtar

(10) Patent No.: US 11,882,441 B2
(45) Date of Patent: *Jan. 23, 2024

(54) QUANTUM AUTHENTICATION FOR WIRELESS USER EQUIPMENT (UE)

(71) Applicant: T-Mobile Innovations LLC, Overland Park, KS (US)

(72) Inventor: Marouane Balmakhtar, Fairfax, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 194 days.

This patent is subject to a terminal disclaimer.

(21) Appl. No.: 17/353,397

(22) Filed: Jun. 21, 2021

(65) Prior Publication Data
US 2022/0408248 A1    Dec. 22, 2022

(51) Int. Cl.
*H04W 12/06* (2021.01)
*H04W 12/041* (2021.01)
*H04L 9/08* (2006.01)

(52) U.S. Cl.
CPC ........... *H04W 12/06* (2013.01); *H04L 9/0858* (2013.01); *H04W 12/041* (2021.01); *H04L 2209/80* (2013.01)

(58) Field of Classification Search
CPC .. H04W 12/06; H04W 12/041; H04L 9/0858; H04L 2209/80; H04L 9/3271; H04L 9/0852; Y02D 30/70
See application file for complete search history.

(56) References Cited

U.S. PATENT DOCUMENTS 10,616,934 B2   4/2020   Talebi Fard et al.
10,863,494 B2   12/2020  Zhang et al.
(Continued)

FOREIGN PATENT DOCUMENTS

CN     102668491 A  *  9/2012  ............ G06Q 20/20
WO     2021016095 A1    1/2021

OTHER PUBLICATIONS

Cui, et al.; "A new scheme for Quantum Key Distribution in Free-space"; Proceedings of the 15th Asia-Pacific conference on Communications (APCC 2009)-153; Oct. 8, 2009; pp. 637-640; IEEE; Piscataway, New Jersey, U.S.A.

*Primary Examiner* — Alexander Lagor
*Assistant Examiner* — Lydia L Noel

(57) ABSTRACT

A wireless communication network performs quantum authentication for a wireless User Equipment (UE). In the wireless communication network, quantum circuitry selects polarization states for qubits, generates and transfers the qubits, exchanges cryptography information with edge quantum circuitry, generates cryptography keys based on polarization states and cryptography information, and transfers the cryptography keys to network authentication circuitry. The edge quantum circuitry receives and process the qubits, determines the polarization states for the qubits, exchanges the cryptography information with the network quantum circuitry, generates the cryptography keys based on the polarization states and cryptography information, and transfers the cryptography keys to the wireless UE. The wireless UE generates authentication data based on the cryptography keys and wirelessly transfers the authentication data for delivery to the network authentication circuitry. The network authentication circuitry receives the cryptography keys and the authentication data and responsively authenticates the wireless UE.

20 Claims, 12 Drawing Sheets

(56) References Cited

U.S. PATENT DOCUMENTS

| | | | |
|---|---|---|---|
| 11,190,349 B1* | 11/2021 | Vakili | H04L 9/0869 |
| 2011/0075839 A1* | 3/2011 | Noh | H04L 9/0858 |
| | | | 380/44 |
| 2013/0083926 A1 | 4/2013 | Hughes et al. | |
| 2019/0052460 A1* | 2/2019 | Fu | H04L 9/0836 |
| 2019/0149365 A1 | 5/2019 | Chatterjee et al. | |
| 2019/0174449 A1 | 6/2019 | Shan et al. | |
| 2019/0174601 A1* | 6/2019 | Carpenter | G06N 10/00 |
| 2020/0177375 A1* | 6/2020 | Buck | H04L 9/0891 |
| 2021/0144517 A1* | 5/2021 | Guim Bernat | H04L 9/0637 |

* cited by examiner

US 11,882,441 B2

QUANTUM AUTHENTICATION FOR WIRELESS USER EQUIPMENT (UE)

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless communication networks have Radio Access Networks (RANs) which exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The RANs exchange network signaling and user data with network elements that are often clustered together into wireless network cores. The RANs are connected to the wireless network cores over backhaul data links.

The RANs comprise Radio Units (RUs), Distributed Units (DUs) and Centralized Units (CUs). The RUs are mounted at elevation and have antennas, modulators, signal processor, and the like. The RUs are connected to the DUs which are usually nearby network computers. The DUs handle lower wireless network layers like the Physical Layer (PHY) and Media Access Control (MAC). The DUs are connected to the CUs which are larger computer centers that are closer to the network cores. The CUs handle higher wireless network layers like the Radio Resource Control (RRC) and Packet Data Convergence Protocol (PDCP). The CUs are coupled to network functions in the network cores. The network cores execute the network functions to provide wireless data services to the wireless user devices over the RANs. Exemplary network functions include Access and Mobility Management Functions (AMFs), Authentication Server Functions (AUSF), and Unified Data Managements (UDMs).

Authentication entails the exchange of data between a wireless user device and a wireless communication network so the network can confirm the identity of the wireless user device. When the wireless user device attaches to the network core over the RAN, the wireless user device registers with an AMF to perform authentication. The AMF interacts with the AUSF and UDM to generate a random number and an expected result. The wireless user device is given the random number to hash with its secret identity code and return the expected result. The AMF matches the two expected results to authenticate the wireless user device. Responsive to the authentication, the wireless user device receives wireless data services from the network core.

Quantum authentication uses the quantum properties of photons to generate secret identity codes. To generate a secret identity code, a quantum device encodes a photon with various quantum states like polarization and spin. The quantum device transfers the encoded photon to another quantum device over an optical interface like a quantum channel. The other quantum device determines the quantum states of the photon. The two quantum devices exchange data to select photons that have matching quantum states. The matching quantum states comprise the secret identity code for the two quantum devices.

Unfortunately, the AMFs and AUSFs do not effectively use quantum authentication for the wireless user devices. Moreover, the UDMs do not efficiently generate quantum based secret identity codes for the wireless user devices.

TECHNICAL OVERVIEW

A wireless communication network performs quantum authentication for a wireless User Equipment (UE). In the wireless communication network, quantum circuitry selects polarization states for qubits, generates and transfers the qubits, exchanges cryptography information with edge quantum circuitry, generates cryptography keys based on polarization states and cryptography information, and transfers the cryptography keys to network authentication circuitry. The edge quantum circuitry receives and process the qubits, determines the polarization states for the qubits, exchanges the cryptography information with the network quantum circuitry, generates the cryptography keys based on the polarization states and cryptography information, and transfers the cryptography keys to the wireless UE. The wireless UE generates authentication data based on the cryptography keys and wirelessly transfers the authentication data for delivery to the network authentication circuitry. The network authentication circuitry receives the cryptography keys and the authentication data and responsively authenticates the wireless UE.

DETAILED DESCRIPTION

Figure 1:
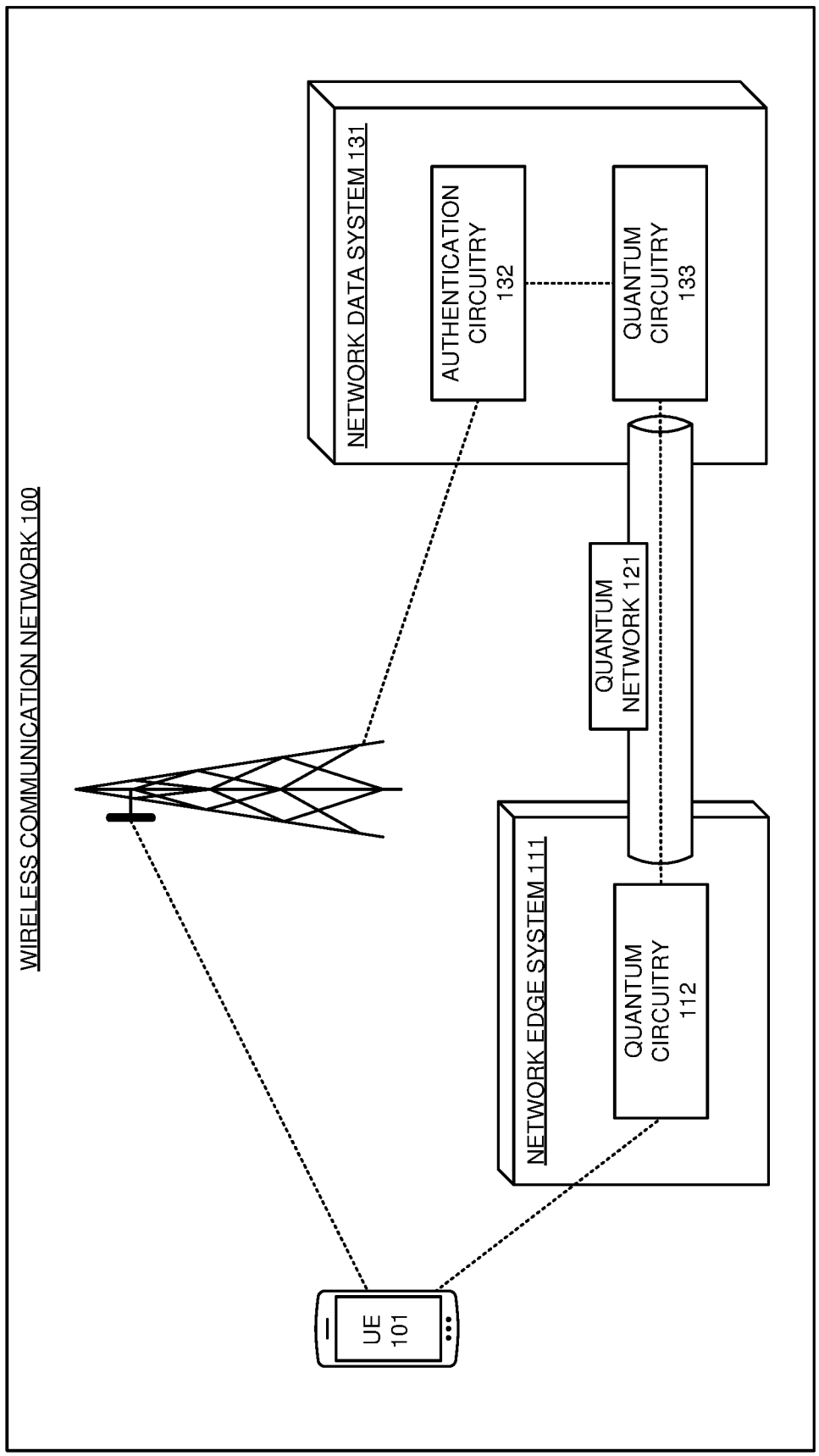
FIG. 1 illustrates a wireless communication network to perform quantum authentication for a wireless User Equipment (UE).

FIG. 1 illustrates wireless communication network 100 network to perform quantum authentication for wireless User Equipment (UE) 101. Wireless communication network 100 delivers services to UE 101 like machine communications, internet-access, media-streaming, or some other wireless communications product. Wireless communication network 100 comprises UE 101, network edge system 111, quantum network 121, and network data system 131. Network edge system 111 comprises edge quantum circuitry 112. Network data system 131 comprises authentication circuitry 132 and quantum circuitry 133. UE 101 is wirelessly coupled to network authentication circuitry 132 over a Radio Access Network (RAN). UE 101 is detachably coupled to network edge system 111 over a wired link.

Various examples of network operation and configuration are described herein. In some examples, network quantum circuitry 133 selects polarization states for qubits. Network quantum circuitry 133 generates and transfers the qubits to edge quantum circuitry 112 over quantum network 121. For example, network quantum circuitry 133 may generate qubits according to the selected polarizations for the qubits and transfer the qubits to edge quantum circuitry 112 over quantum network 121. The qubits may comprise entangled or non-entangled qubits. Edge quantum circuitry 112 processes the qubits and determines the polarization states for the qubits. Network quantum circuitry 133 and edge quantum circuitry 112 exchange the cryptography information with each other. For example, the cryptography information may indicate the selected polarizations and the determined polarizations. Network quantum circuitry 133 generates cryptography keys based on polarization states and cryptography information and transfers the cryptography keys to network authentication circuitry 132. Edge quantum circuitry 112 generates the cryptography keys based on the polarization states and cryptography information and transfers the cryptography keys to the wireless UE 101. Wireless UE 101 generates authentication data based on the cryptography keys and wirelessly transfers the authentication data for delivery to network authentication circuitry 132. Network authentication circuitry 132 responsively authenticate wireless UE 101 based on the cryptography keys and the authentication data. Advantageously, authentication circuitry 132 effectively uses quantum authentication to authenticate UE 101. Moreover, edge quantum circuitry 112 and network quantum circuitry 133 efficiently generate quantum-based cryptography keys for UE 101 using quantum authentication.

UE 101 and the RAN communicate over links using wireless technologies like Fifth Generation New Radio (5GNR), Long Term Evolution (LTE), Low-Power Wide Area Network (LP-WAN), Institute of Electrical and Electronic Engineers (IEEE) 802.11 (WIFI), Bluetooth, and/or some other type of wireless or wireline networking protocol. The wireless technologies use electromagnetic frequencies in the low-band, mid-band, high-band, or some other portion of the electromagnetic spectrum. UE 101 and edge quantum circuitry 112 communicate over a wired connection. The wired connection comprises metallic links, glass fibers, and/or some other type of wired interface. Edge quantum circuitry 112 and network quantum circuitry 133 communicate over quantum network 121. Quantum network 121 comprises metallic links, glass fibers, quantum repeaters, vacuums, and/or other types of mediums that can transfer quantum information. Quantum network 121 supports quantum authentication technologies like Quantum Key Distribution (QKD), quantum cryptography, and/or other types of quantum-based cryptography protocols. The RAN and network data center 131 communicate over various links that use metallic links, glass fibers, radio channels, or some other communication media. The links use Fifth Generation Core (5GC), IEEE 802.3 (ENET), Time Division Multiplex (TDM), Data Over Cable System Interface Specification (DOCSIS), Internet Protocol (IP), General Packet Radio Service Transfer Protocol (GTP), 5GNR, LTE, WIFI, virtual switching, inter-processor communication, bus interfaces, and/or some other data communication protocols.

UE 101 comprises a vehicle, drone, robot, computer, phone, sensor, or another type of data appliance with wireless circuitry. The RAN is depicted as a tower, but the RAN may use another mounting structure or no mounting structure at all. The RAN comprises a Fifth Generation (5G) RAN, LTE RAN, gNodeB, eNodeB, NB-IoT access node, LP-WAN base station, wireless relay, WIFI hotspot, Bluetooth access nodes, and/or another wireless network transceiver. UE 101 and the RAN comprise antennas, amplifiers, filters, modulation, analog/digital interfaces, microprocessors, software, memories, transceivers, bus circuitry, and the like. Network authentication circuitry 132 comprises network functions like Access and Mobility Management functions (AMFs), Authentication Server Functions (AUSFs), Unified Data Managements (UDMs), and the like. Network quantum circuitry 133 comprises network functions like a quantum capable UDM. Edge quantum circuitry 112 comprises network functions like a quantum capable UDM. UE 101, the RAN, network edge system 111, and network data center 131 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network functions. The microprocessors retrieve the software from the memories and execute the software to drive the operation of wireless communication network 100 as described herein.

Figure 2:
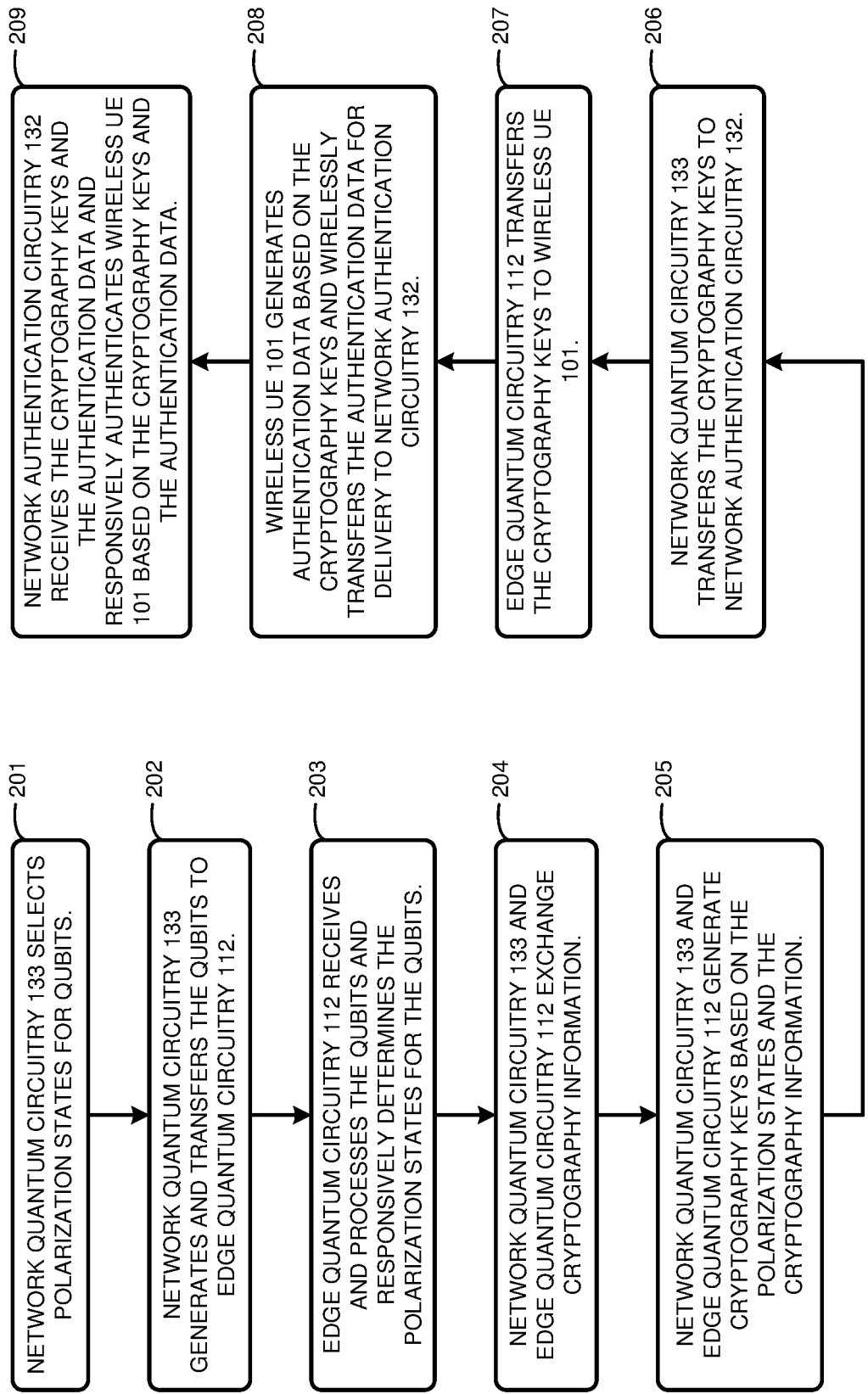
FIG. 2 illustrates an exemplary operation of the wireless communication network to perform quantum authentication for the wireless UE.

FIG. 2 illustrates an exemplary operation of wireless communication network 100 to perform quantum authentication for wireless UE 101. The operation may vary in other examples. Network quantum circuitry 133 selects polarization states for qubits (201). Network quantum circuitry 133 generates and transfers qubits to edge quantum circuitry 112 (202). For example, network quantum circuitry may generate photons that have different polarization states and transfer the polarized photons to edge quantum circuitry 112 over quantum network 121. Edge quantum circuitry 112 receives and processes the qubits and responsively determines polarization states for the qubits (203). Network quantum circuitry 133 and edge quantum circuitry 112 exchange cryptography information (204). Network quantum circuitry 133 and edge quantum circuitry 112 generate cryptography keys based on the polarization states and the cryptography information (205). Network quantum circuitry 133 transfers the cryptography keys to network authentication circuitry 132 (206). Edge quantum circuitry 112 transfers the cryptography keys to wireless UE 101 (207). Wireless UE 101 generates authentication data based on the cryptography keys and wirelessly transfers the authentication data for delivery to network authentication circuitry 132 (208). Network authentication circuitry 132 receives the cryptography keys and the authentication data and responsively authenticates wireless UE 101 based on the cryptography keys and the authentication data (209).

Figure 3:
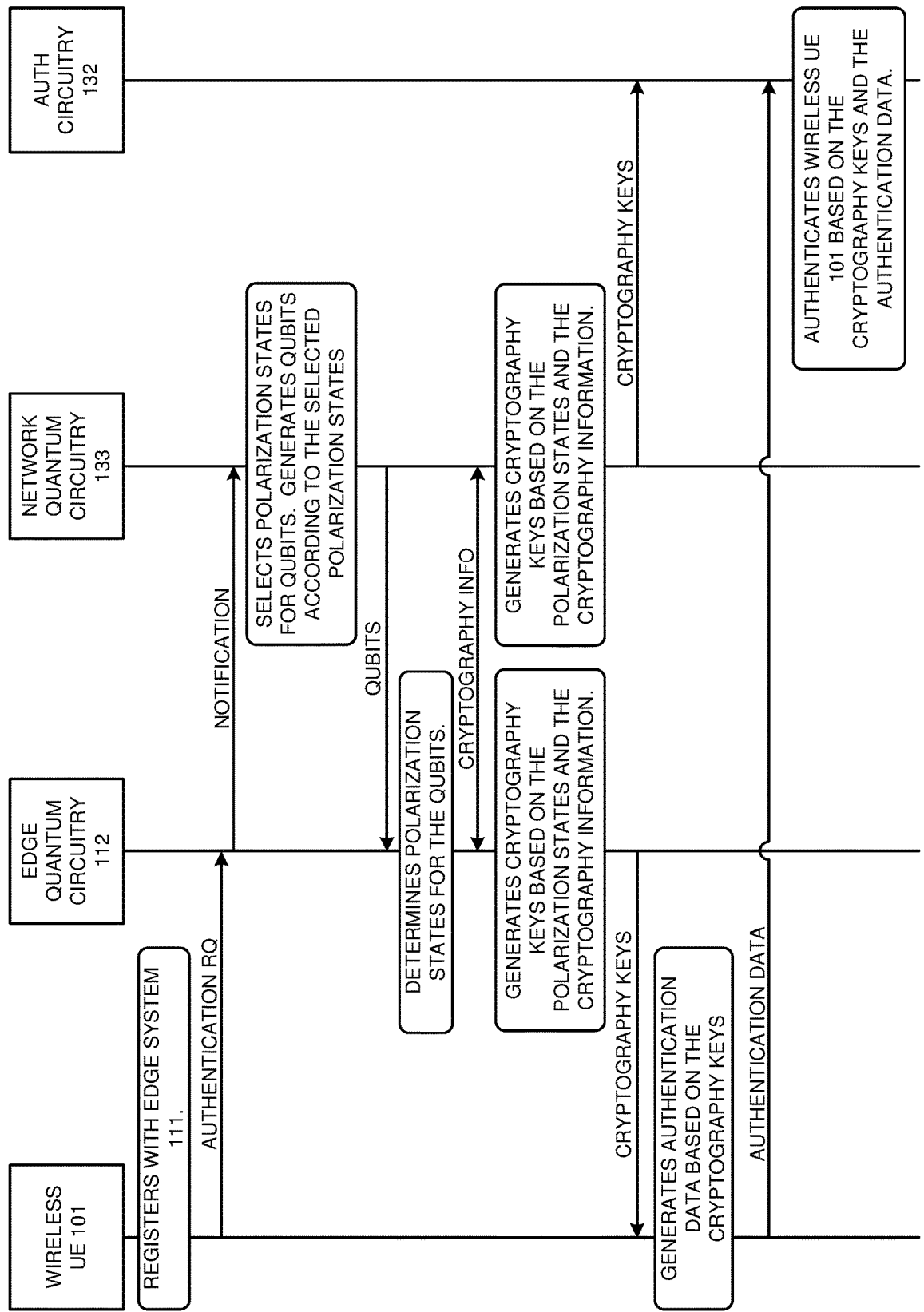
FIG. 3 illustrates another exemplary operation of the wireless communication network to perform quantum authentication for the wireless UE.

FIG. 3 illustrates an exemplary operation of wireless communication network 100 to perform quantum authentication for wireless UE 101. The operation may vary in other examples. Wireless UE 101 registers with edge system 111. For example, UE 101 may attach to edge system 11 over a wired connection to confirm its device identity. Wireless UE 101 transfers an authentication request (RQ) for quantum-based cryptography keys to edge quantum circuitry 112. Edge quantum circuitry 112 transfers a notification that indicates the authentication request to network quantum circuitry 133. In response, network quantum circuitry 133 selects polarization states for qubits. For example, network quantum circuitry 133 may select horizontal and vertical polarization states to polarize the qubits. Network quantum circuitry 133 generates qubits. The qubits may comprise photons, electrons, atoms, or other types of particles that can transfer quantum information. Network quantum circuitry 133 polarizes the qubits according to the selected polarization states. For example, network quantum circuitry 133 may horizontally polarize a first qubit, vertically polarize a second qubit, and vertically polarize a third qubit. Network quantum circuitry 133 transfers the qubits over quantum network 121 to edge quantum circuitry 112. Edge quantum circuitry 112 processes the qubits and responsively determines polarization states for the qubits. For example, edge quantum circuitry 112 may select a measurement basis for individual photons and determine the polarization states for the individual photons using their selected measurement bases. The measurement bases may comprise, a rectilinear basis, a diagonal measurement basis, or some other type of measurement basis. Edge quantum circuitry 112 exchanges cryptography data that indicates the determined polarization states with network quantum circuitry 133. Network quantum circuitry 133 exchanges cryptography data that indicates the selected polarization states with edge quantum circuitry 112. Network quantum circuitry 133 and edge quantum circuitry 112 may exchange the cryptography information over wireless or wired classical communication links. In some examples, quantum network 121 comprises both quantum and classical communication links and network quantum circuitry 133 and edge quantum circuitry 112 may exchange the cryptography information over the classical channels in quantum network 121.

Network quantum circuitry 133 and edge quantum circuitry 112 generate cryptography keys based on the polarization states and the cryptography information. For example, edge quantum circuitry 112 and network quantum circuitry 133 may compare the polarization states determined by edge quantum circuitry 112 with the polarization states selected by network quantum circuitry 133 to derive one or more quantum-based authentication keys. Edge quantum circuitry 112 transfers the cryptography keys to wireless UE 101. Likewise, network quantum circuitry 133 transfers the cryptography keys to network authentication circuitry 132.

UE 101 processes the cryptography keys and responsively generates authentication data. The authentication data comprises hashes, digital certificates, or another type of authentication data to authenticate UE 101 with network data center 121. For example, UE 101 may receive an authentication challenge from network authentication circuitry 132 and use the quantum key to resolve the authentication challenge to generate the authenticate data. UE 101 wirelessly transfers the authentication data to network authentication circuitry 132 over the RAN. Network authentication circuitry 132 authenticates UE 101 based on the authentication data and the cryptography keys. For example, network authentication circuitry 132 may receive an authentication result from UE 101 and use its quantum-based cryptography key to verify the authentication result from UE 101.

Figure 4:
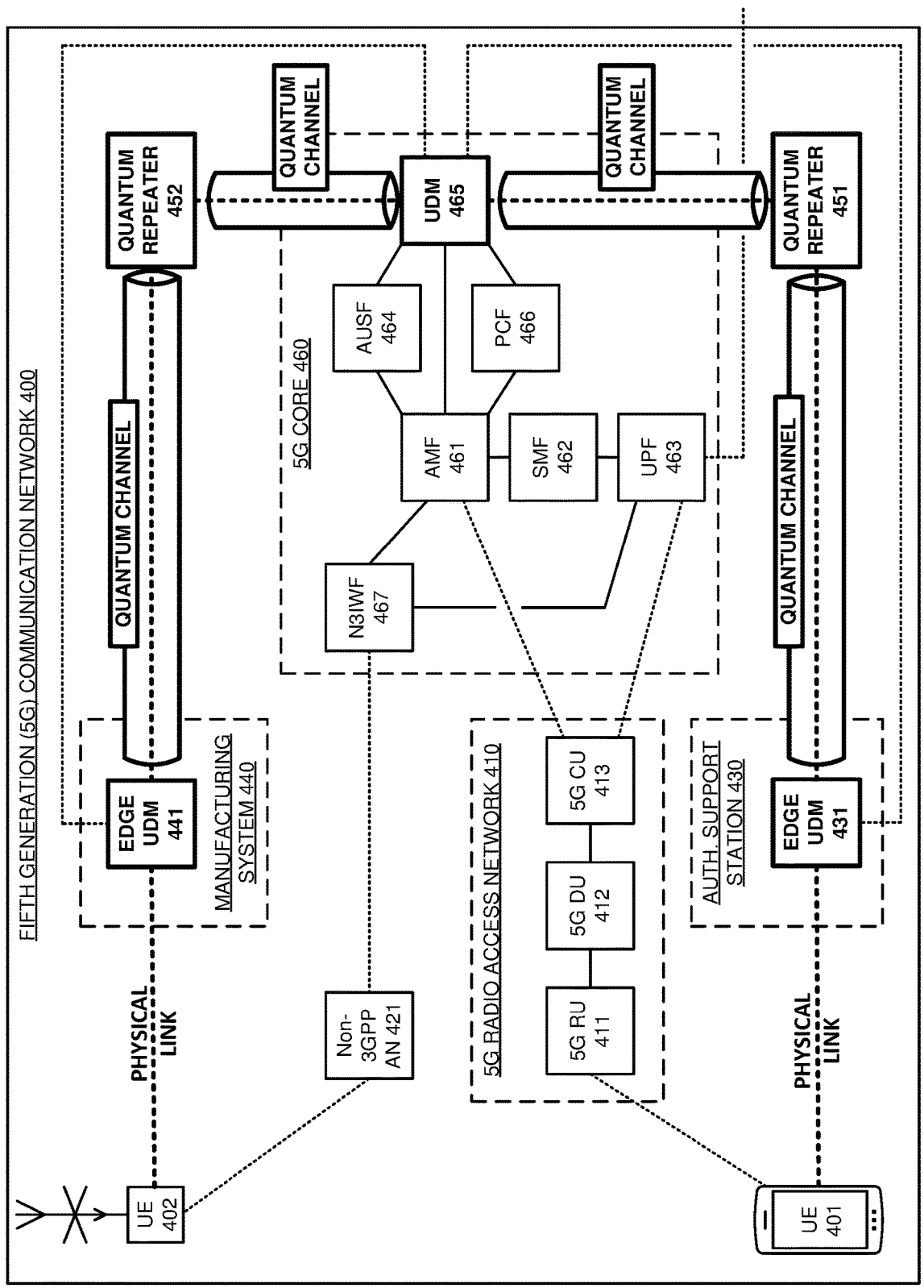
FIG. 4 illustrates a Fifth Generation (5G) communication network to perform quantum authentication for UEs.

FIG. 4 illustrates Fifth Generation (5G) communication network 400 to perform quantum authentication for UEs 401 and 402. 5G communication network 400 comprises an example of wireless communication network 100, although network 100 may differ. 5G communication network 400 comprises Third Generation Partnership Project (3GPP) UE 401, non-3GPP UE 402, 5G RAN 410, non-3GPP Access Network (AN) 421, authentication support station 430, manufacturing system 440, quantum repeaters 451-452, and 5G network core 460. 3GPP UE 401 comprises a smartphone that communicates over 3GPP links like Fifth Generation New Radio (5GNR) and Long Term Evolution (LTE). Non-3GPP UE 402 comprises a sensor that communicates over non-3GPP links like Institute of Electrical and Electronic Engineers (IEEE) 802.11 (WIFI) and IEEE 802.3 (ENET). 5G RAN 410 comprises 5G Radio Unit (RU) 411, 5G Distributed Unit (DU) 412, and 5G Centralized Unit (CU) 413. Authentication support station 430 comprises edge Unified Data Management (UDM) 431. Manufacturing system 440 comprises edge UDM 441. 5G network core 460 comprises Access and Mobility Management Function (AMF) 461, Session Management Function (SMF) 462, User Plane Function (UPF) 463, Authentication Server Function (AUSF) 464, UDM 465, Policy Control Function (PCF) 466, and Non-3GPP Interworking Function (N3IWF) 467. Other network functions and network elements are typically present in 5G network core 460 but are omitted for clarity.

UE 401 detachably couples to edge UDM 431 in authentication support station 430. UE 401 authenticates with authentication support station 430. Authentication support station 430 comprises a mobile phone store, a network support station, a customer support station, or some other type of system that verifies the identity of, and initiates quantum key generation for UE 401. For example, a user may purchase UE 401 at authentication support station 430 and edge UDM 431 may responsively authenticate UE 401. UE 401 comprises a unique ID that indicates its identity and uses this unique ID to authenticate itself with authentication support station 430. Typically, UE 401 communicates with authentication support station 430 over a secure wired connection. In response to the authentication, edge UDM 431 transfers an authentication notification for UE 401 to UDM 465 to initiate a Quantum Key Distribution (QKD) procedure with UDM 465. The QKD procedure comprises QKD protocols like an BB84 protocol, an E91 protocol, or another type of QKD protocol. UDM 465 generates qubits. The number of qubits generated by UDM 465 is not limited. UDM 465 selects a polarization basis for individual ones of the qubits and polarizes the qubits using their selected polarization bases. Typically, UDM 465 selects either a vertical or horizontal polarization basis for each of the qubits. For example, a vertically polarized qubit may comprise an electromagnetic wave in a vertical sinusoidal plane and a horizontally polarized qubit may comprise an electromagnetic wave in a vertical sinusoidal plane.

UDM 465 transfers the polarized qubits to quantum repeater 451 over a quantum channel. The qubits may comprise entangled or non-entangled qubits. For example, UDM 465 may entangle pairs of photons and transfer one of the photons from each entangled pair to quantum repeater 451. The quantum channels comprise optical interfaces, metallic links, glass fibers, vacuums, and/or some other type of interface that can transfer quantum information. The length of the quantum channels is not limited. For example, the quantum channels may exceed ten miles in length. Typically, when the length of the quantum channels is excessive, many more quantum repeaters are used than illustrated in FIG. 4. Quantum repeater 451 receives the qubits from UDM 465. Quantum repeater 451 entangles the set of qubits received from UDM 465 with another set of qubits. For example, quantum repeater 451 may entangle a qubit from UDM 465 with a qubit resident in quantum repeater 451 to transfer the polarization state of the qubit from UDM 465 to the qubit resident in quantum repeater 451. Quantum repeater 451 transfers the entangled qubits to edge UDM 431 over the quantum channel.

Edge UDM 431 receives the qubits from quantum repeater 451. Edge UDM 431 selects a measurement basis for individual ones of the qubits received from quantum repeater 451. For example, edge UDM 431 may select a rectilinear measurement basis for a first qubit and may select a diagonal measurement basis for a second qubit. Edge UDM 431 determines the polarization states of the received qubits using the corresponding measurement basis for each of the received qubits. Edge UDM 431 indicates the determined polarizations of the received qubits to UDM 465. UDM 465 indicates the selected polarizations for each of the qubits to edge UDM 431. Edge UDM 431 and UDM 465 generate a quantum derived authentication key for UE 401 based on the determined polarizations of the received qubits and the selected polarizations for the transferred qubits. Typically, edge UDM 431 and UDM 465 derive the key based on the qubits where the selected polarization for the transferred qubits matched the determined polarizations for the received qubits. Typically, when the selected polarization basis differs from the selected measurement basis for a qubit, the determined polarization will differ from the selected polarization. Edge UDM 431 transfers the authentication key to UE 401. UDM 465 stores the quantum derived key. UE 401 detaches from authentication support station 430 and moves to another location. In some examples, UDM 465 transfers the quantum derived key to other UDMs in other regions of 5G communication network 400.

UE 401 wirelessly attaches to RU 411 and transfers attachment signaling to CU 413 over RU 411 and DU 412. CU 413 establishes a Radio Resource Control (RRC) connection with UE 401. CU 413 transfers a registration request for UE 401 to AMF 461. AMF 461 transfers an identity request for UE 401 to CU 413. For example, a Security Anchor Function (SEAF) in AMF 461 may receive the registration request and responsively transfer the identity request to CU 413. CU 413 forwards the identity request to UE 401 over DU 412 and RU 411. In response, UE 401 indicates its identity to CU 413 over RU 411 and DU 413. CU 413 forwards the identity indication for UE 401 to AMF 461. AMF 461 selects AUSF 464 to authenticate UE 401 for wireless services. AMF 461 transfers an authentication request for UE 401 to AUSF 464.

AUSF 464 selects UDM 465 to authenticate UE 401. AUSF 464 requests authentication keys for UE 401 from UDM 465. UDM 465 indicates the quantum derived authentication key for UE 401 to AUSF 464. For example, an Authentication Credential Repository and Processing Function (ARPF) in UDM 465 may generate authentication vectors based on the quantum derived key and indicate the authentication vectors to AUSF 464. AUSF 464 generates an expected result based on the quantum derived authentication key for UE 401 and a random number. AUSF 464 transfers the random number and the expected result for UE 401 to AMF 461. AMF 461 indicates the authentication method and transfers the random number for UE 401 to CU 413. CU 413 forwards the random number and indicated authentication method to UE 401 over DU 412 and RU 411. UE 401 identifies the authentication method and responsively hashes the random number with its quantum derived authentication key to generate the same expected result. UE 401 transfers the expected result to CU 413. CU 413 forwards the expected result to AMF 461. AMF 461 matches the two expected results to authenticate the identity of UE 401.

Responsive to the authentication and authorization, AMF 461 requests UE context for UE 401 from UDM 465. UDM 465 transfers UE context for UE 401 to AMF 461. The UE context comprises Quality-of-Service (QoS) metrics, slice identifiers, network addresses, and the like. AMF 461 retrieves service policies for UE 401 from PCF 466. AMF 461 selects SMF 462 to establish a Protocol Data Unit (PDU) session for UE 401 based on the UE context and the service policies. SMF 462 selects UPF 463 to establish the PDU session for UE 401. SMF 462 transfers session context for the PDU session to AMF 461. AMF 461 transfers the session context to UE 401 over RAN 410. UE 401 begins the PDU session based on the session context. UE 401 wirelessly exchanges user data with CU 413 over RU 411 and DU 412. CU 413 exchanges the user data with UPF 463. UPF 463 exchanges the user data with external systems.

In a similar manner, UE 402 detachably couples to edge UDM 441 in manufacturing system 440. UE 402 authenticates with manufacturing system 440. In response to the authentication, edge UDM 441 initiates a QKD procedure with UE 402. For example, manufacturing system 440 may have constructed UE 402 and authenticates UE 402 for device configuration. Edge UDM 441 transfers a manufacturing notice to UDM 465. In response to the manufacturing notice, UDM 465 selects a polarization bases and generates the qubits in accordance with their selected polarization bases. UDM 465 transfers the polarized qubits to quantum repeater 452 over the quantum channel.

Quantum repeater 452 receives the qubits from UDM 465. Quantum repeater 452 entangles the set of qubits received from UDM 465 with another set of qubits. Quantum repeater 452 transfers the entangled qubits to edge UDM 441 over the quantum channel. Edge UDM 441 receives the qubits from quantum repeater 452. Edge UDM 441 selects a measurement basis for each of the individual qubits received from quantum repeater 452. Edge UDM 441 determines the polarizations of the received qubits using the corresponding selected measurement basis for each of the received qubits. Edge UDM 441 indicates the determined polarizations of the received qubits to UDM 465. UDM 465 indicates the polarizations it selected for each of the transferred qubits to edge UDM 441. Edge UDM 441 and UDM 465 generate a quantum derived authentication key for UE 402 based on the determined polarizations of the received qubits and the selected polarizations for the transferred qubits. Edge UDM 441 transfers the authentication key to UE 402. UDM 465 stores the quantum derived authentication key for UE 402. UE 402 detaches from manufacturing system 440 and moves to another location.

UE 402 wirelessly attaches to non-3GPP AN 421 and transfers attachment signaling to non-3GPP AN 421. In response to the attachment signaling, non-3GPP AN 421 transfers a registration request for UE 402 to N3IWF 467. N3IWF 467 forwards the registration request to AMF 461. AMF 461 transfers an identity request to UE 402 over N3IWF 467 and non-3GPP AN 421. In response, UE 402 indicates its identity to AMF 461. AMF 461 selects AUSF 464 to authenticate UE 402 for wireless services and transfers an authentication request for UE 402 to AUSF 464.

AUSF 464 selects UDM 465 to authenticate UE 402. AUSF 464 requests authentication keys for UE 402 from UDM 465. UDM 465 transfers authentication data for UE 402 that indicates the quantum derived authentication key to AUSF 464. AUSF 464 uses the quantum derived authentication key for UE 402 and a random number to generate an expected result. AUSF 464 transfers the random number and the expected result for UE 402 to AMF 461. AMF 461 transfers the random number to UE 402 over N3IWF 467 and non-3GPP AN 421. UE 402 hashes the random number with its quantum derived authentication key to generate the same expected result. UE 402 transfers the expected result to AMF 461 over non-3GPP AN 421 and N3IWF 467. AMF 461 matches the two expected results to authenticate the identity of UE 402.

Responsive to the authentication and authorization, AMF 461 retrieves UE context for UE 402 from UDM 465. AMF 461 retrieves retrieve service policies for UE 402 from PCF 466. AMF 461 selects SMF 462 to establish a PDU session for UE 402 based on the UE context and the service policies. SMF 462 selects UPF 463 to establish the PDU session for UE 402. SMF 462 transfers session context for the PDU session to AMF 461. AMF 461 transfers the session context to UE 402 over N3IWF 467 and non-3GPP AN 421. UE 402 wirelessly exchanges user data with UPF 463 over non-3GPP AN 421 and N3IWF 467. UPF 463 exchanges the user data with external systems.

Figure 5:
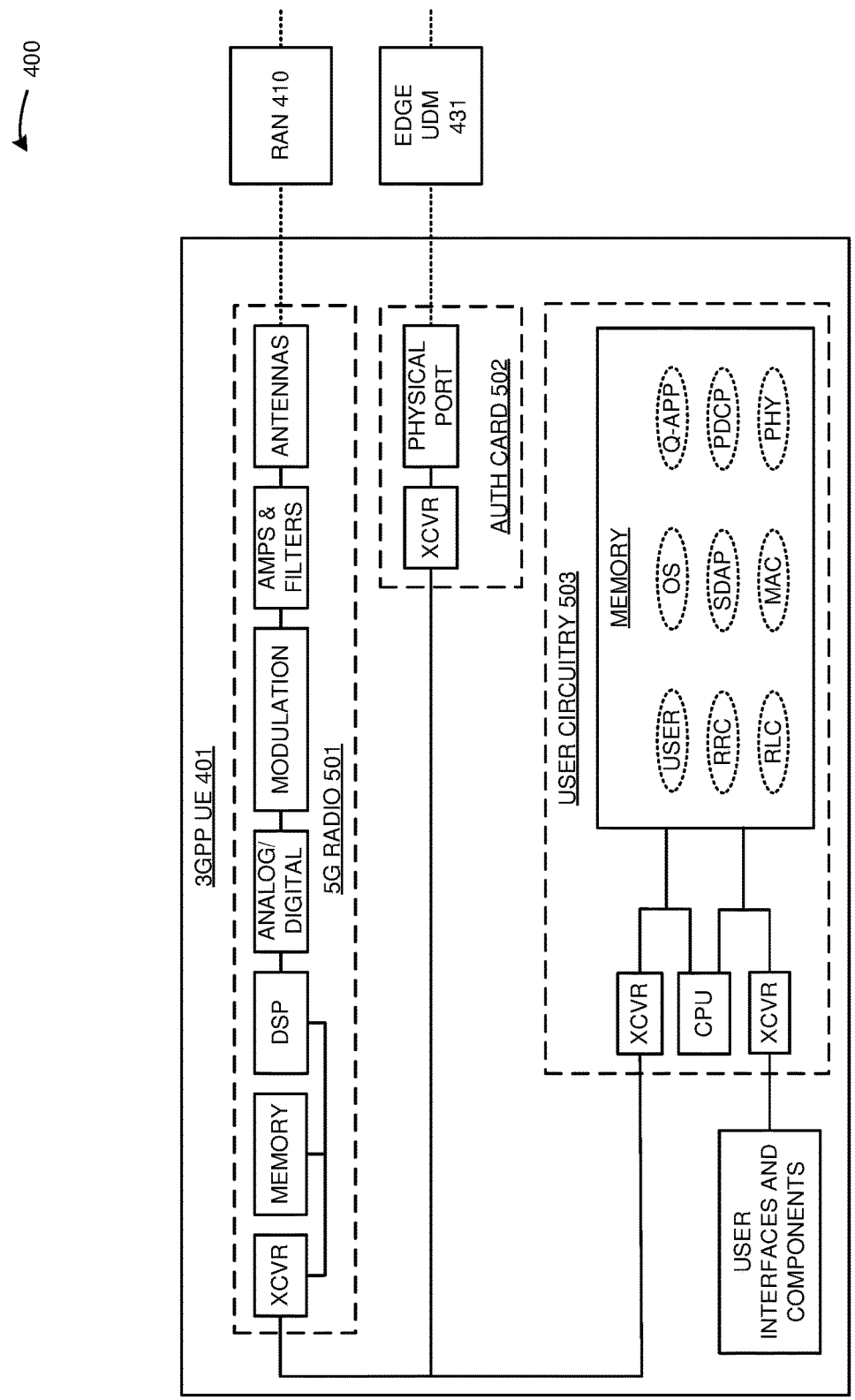
FIG. 5 illustrates a Third Generation Partnership Project (3GPP) UE in the 5G communication network.

FIG. 5 illustrates 3GPP UE 401 5G communication network 400. UE 401 comprises an example of UE 101, although UE 101 may differ. UE 401 comprises 5G radio 501, authentication (AUTH) card 502, and user circuitry 503. Radio 501 comprises antennas, amplifiers, filters, modulation, analog-to-digital interfaces, Digital Signal Processers (DSP), memory, and transceivers (XCVRs) that are coupled over bus circuitry. Authentication card 502 comprises a physical port and transceivers that are coupled over bus circuitry. The physical port in authentication card 502 may comprise a pin/socket interface for a Universal Serial Bus (USB) connector or some other type of physical interface that supports data transfer. User circuitry 503 comprises memory, CPU, user interfaces and components, and transceivers that are coupled over bus circuitry. The memory in user circuitry 503 stores an operating system (OS), user applications (USER), Quantum Applications (Q-APP), and 5GNR network applications for Physical Layer (PHY), Media Access Control (MAC), Radio Link Control (RLC), Packet Data Convergence Protocol (PDCP), Service Data Adaptation Protocol (SDAP), and Radio Resource Control (RRC). The antenna in radio 501 is wirelessly coupled to 5G RAN 410 over a 5GNR link. The physical port in authentication card 502 is coupled to edge UDM 431 over a wired connection. A transceiver in radio 501 is coupled to a transceiver in user circuitry 503. A transceiver in authentication card 502 is coupled to a transceiver in user circuitry 503. A transceiver in user circuitry 503 is typically coupled to the user interfaces and components like displays, controllers, and memory.

In radio 501, the antennas receive wireless signals from 5G RAN 410 that transport downlink 5GNR signaling and data. The antennas transfer corresponding electrical signals through duplexers to the amplifiers. The amplifiers boost the received signals for filters which attenuate unwanted energy. Demodulators down-convert the amplified signals from their carrier frequency. The analog/digital interfaces convert the demodulated analog signals into digital signals for the DSPs. The DSPs transfer corresponding 5GNR symbols to user circuitry 503 over the transceivers. In user circuitry 503, the CPU executes the network applications to process the 5GNR symbols and recover the downlink 5GNR signaling and data. The 5GNR network applications receive new uplink signaling and data from the user applications. The network applications process the uplink user signaling and the downlink 5GNR signaling to generate new downlink user signaling and new uplink 5GNR signaling. The network applications transfer the new downlink user signaling and data to the user applications. The 5GNR network applications process the new uplink 5GNR signaling and user data to generate corresponding uplink 5GNR symbols that carry the uplink 5GNR signaling and data.

In radio 501, the DSP processes the uplink 5GNR symbols to generate corresponding digital signals for the analog-to-digital interfaces. The analog-to-digital interfaces convert the digital uplink signals into analog uplink signals for modulation. Modulation up-converts the uplink analog signals to their carrier frequency. The amplifiers boost the modulated uplink signals for the filters which attenuate unwanted out-of-band energy. The filters transfer the filtered uplink signals through duplexers to the antennas. The electrical uplink signals drive the antennas to emit corresponding wireless 5GNR signals to 5G RAN 410 that transport the uplink 5GNR signaling and data.

In authentication card 502, the physical port detachably couples to edge UDM 431 in authentication support station 430 over a wired connection. UE 401 verifies its identity with edge UDM 431 over authentication card 502. For example, the memory in user circuitry 503 may store a unique code that identifies UE 401 and UE 401 may transfer the unique code to edge UDM 431 over authentication card 502. Once the identity of UE 401 is verified, edge UDM 431 interacts with UDM 465 to generate a quantum derived authentication key for UE 401. Authentication card 502 receives the quantum derived authentication key from UDM 431 and transfers the quantum derived authentication key to user circuitry 503. User circuitry 503 stores the key in memory. UE 401 uses the quantum derived key to authenticate itself with 5G core 560.

RRC functions comprise authentication, security, handover control, status reporting, QoS, network broadcasts and pages, and network selection. SDAP functions comprise QoS marking and flow control. PDCP functions comprise security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, Hybrid ARQ (HARQ), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, channel coding/decoding, channel estimation/equalization, and rate matching/de-matching, scrambling/descrambling, modulation mapping/de-mapping, layer mapping/de-mapping, precoding, Resource Element (RE) mapping/de-mapping, Fast Fourier Transforms (FFTs)/Inverse FFTs (IFFTs), and Discrete Fourier Transforms (DFTs)/Inverse DFTs (IDFTs). Q-APP functions comprise authentication and quantum key requesting.

Figure 6:
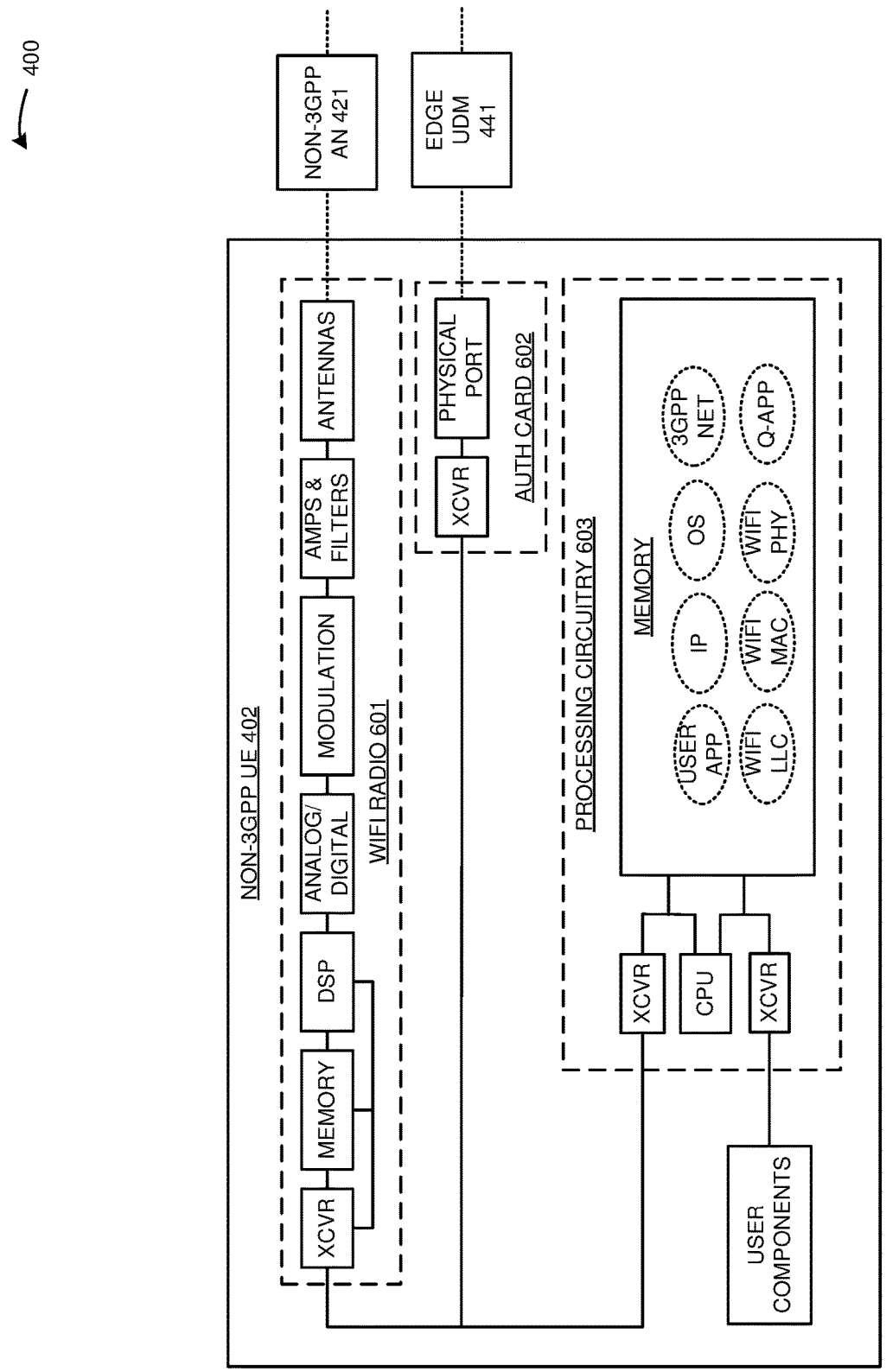
FIG. 6 illustrates a non-3GPP UE in the 5G communication network.

FIG. 6 illustrates non-3GPP UE 402 in 5G communication network 400. UE 402 comprises an example of UE 101, although UE 101 may differ. UE 402 comprises WIFI radio 601, authentication card 602, and processing circuitry 603. WIFI radio 601 comprises antennas, amplifiers, filters, modulation, analog-to-digital interfaces, DSP, memory, and transceivers that are coupled over bus circuitry. Authentication card 602 comprises a physical port and transceivers that are coupled over bus circuitry. Processing circuitry 603 comprises memory, CPU, user interfaces and components, and transceivers (XCVRs) that are coupled over bus circuitry. The memory in processing circuitry 603 stores an operating system (OS), quantum application (Q-APP), and network applications like Internet Protocol (IP), WIFI Physical Layer (PHY), WIFI Media Access Control (MAC), WIFI Logical Link Control (LLC), and 3GPP Networking (3GPP NET). In some examples, the WIFI components of UE 402 may be omitted, and UE 401 may instead comprise an ENET device. For example, if UE 402 comprise an ENET device, UE 402 would comprise an ENET card and ENET networking application while WIFI radio 601 and WIFI network applications would not be present.

The antennas in WIFI radio 601 are wirelessly coupled to non-3GPP access node 421 over a non-3GPP wireless link. Transceivers in WIFI radio 601 are coupled to transceivers in processing circuitry 603. Transceivers in authentication card 602 are coupled to transceivers in processing circuitry 603. The transceivers in processing circuitry 603 are coupled to user components like displays, controllers, and memory. The CPU in processing circuitry 603 executes the operating system, quantum application, and WIFI network applications to authenticate over, and exchange data with non-3GPP access node 421 over WIFI radio 601. UE 402 could also use other non-3GPP protocols like bluetooth and narrowband internet-of-things.

The physical port in authentication card 602 is detachably coupled to edge UDM 441 in manufacturing system 440 over a wired connection. The wired connection comprises metallic and/or glass links. UE 402 verifies its identity with edge UDM 441 over authentication card 502. Edge UDM 441 interacts with UDM 465 to generate a quantum derived authentication key for UE 402. Authentication card 502 receives the quantum derived authentication key from UDM 441 and transfers the quantum derived authentication key to processing circuitry 603. Processing circuitry 603 stores the key in memory. UE 402 uses the quantum derived key to authenticate itself with 5G core 560.

Figure 7:
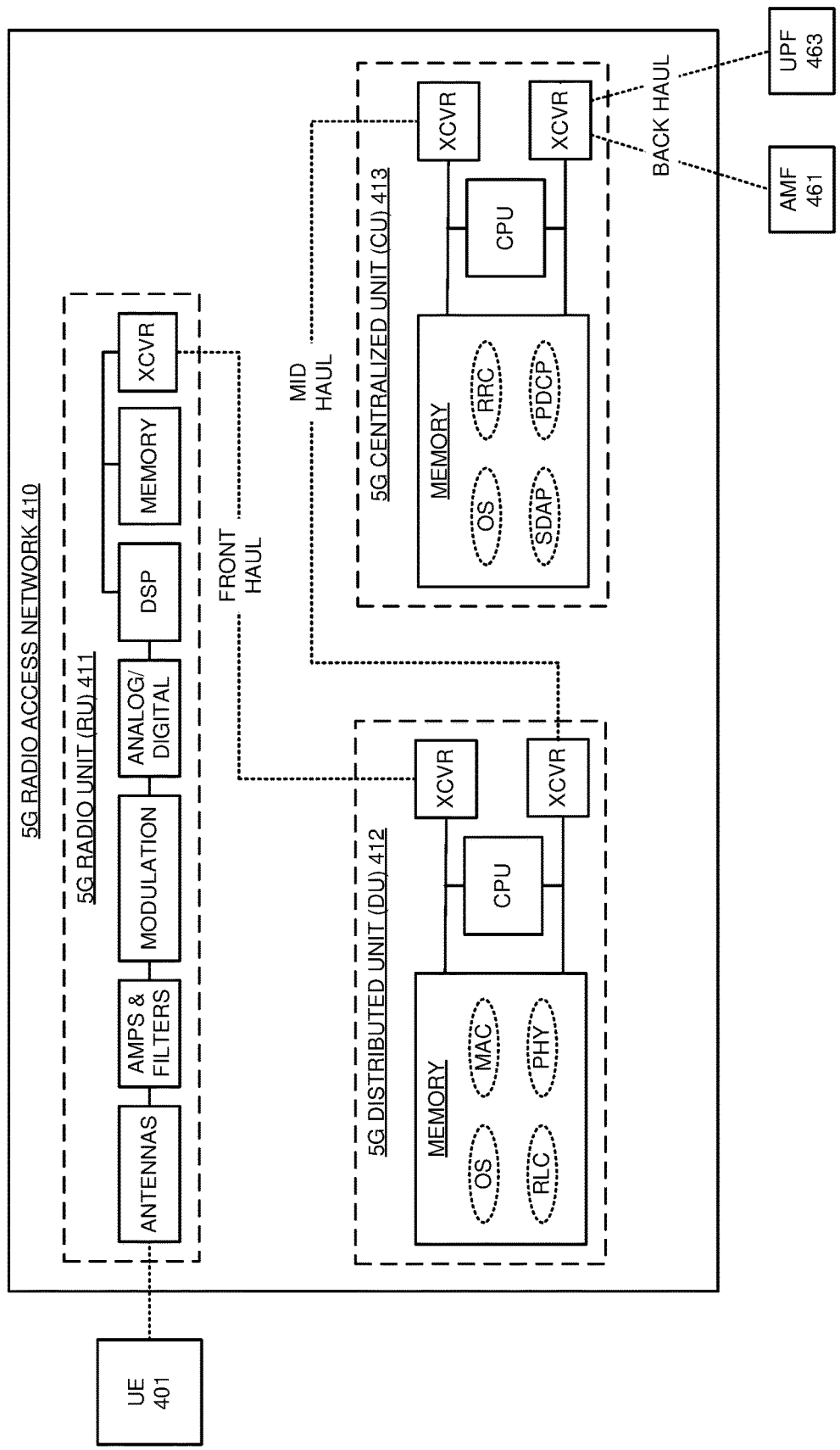
FIG. 7 illustrates a 5G Radio Access Network (RAN) in the 5G communication network.

FIG. 7 illustrates 5G RU 411, 5G DU 412, and 5G CU 413 in 5G communication network 400. RU 411, DU 412, and CU 413 comprise an example of the RAN illustrated in FIG. 1, although the RAN illustrated in FIG. 1 may differ. RU 411 comprises antennas, amplifiers, filters, modulation, analog-to-digital interfaces, DSP, memory, and transceivers (XCVRs) that are coupled over bus circuitry. UE 401 is wirelessly coupled to the antennas in RU 411 over 3GPP 5GNR links. Transceivers in 5G RU 411 are coupled to transceivers in 5G DU 412 over fronthaul links like enhanced Common Public Radio Interface (eCPRI). The DSPs in RU 411 executes their operating systems and radio applications to exchange 5GNR signals with UE 401 and to exchange 5GNR data with DU 412.

For the uplink, the antennas receive wireless signals from UE 401 that transport uplink 5GNR signaling and data. The antennas transfer corresponding electrical signals through duplexers to the amplifiers. The amplifiers boost the received signals for filters which attenuate unwanted energy. Demodulators down-convert the amplified signals from their carrier frequencies. The analog/digital interfaces convert the demodulated analog signals into digital signals for the DSPs. The DSPs transfer corresponding 5GNR symbols to DU 412 over the transceivers.

For the downlink, the DSPs receive downlink 5GNR symbols from DU 412. The DSPs process the downlink 5GNR symbols to generate corresponding digital signals for the analog-to-digital interfaces. The analog-to-digital interfaces convert the digital signals into analog signals for modulation. Modulation up-converts the analog signals to their carrier frequencies. The amplifiers boost the modulated signals for the filters which attenuate unwanted out-of-band energy. The filters transfer the filtered electrical signals through duplexers to the antennas. The filtered electrical signals drive the antennas to emit corresponding wireless signals to 3GPP UE 401 that transport the downlink 5GNR signaling and data.

DU 412 comprises memory, CPU, and transceivers that are coupled over bus circuitry. The memory in 5G DU 412 stores operating systems and 5GNR network applications like PHY, MAC, and RLC. CU 413 comprises memory, CPU, and transceivers that are coupled over bus circuitry. The memory in CU 413 stores an operating system and 5GNR network applications like PDCP, SDAP, and RRC. Transceivers in 5G DU 412 are coupled to transceivers in RU 411 over front-haul links. Transceivers in DU 412 are coupled to transceivers in CU 413 over mid-haul links. A transceiver in CU 413 is coupled to network core 460 over backhaul links.

RLC functions comprise ARQ, sequence numbering and resequencing, segmentation and resegmentation. MAC functions comprise buffer status, power control, channel quality, HARQ, user identification, random access, user scheduling, and QoS. PHY functions comprise packet formation/deformation, guard-insertion/guard-deletion, parsing/de-parsing, control insertion/removal, interleaving/de-interleaving, FEC encoding/decoding, channel coding/decoding, channel estimation/equalization, and rate matching/de-matching, scrambling/descrambling, modulation mapping/de-mapping, layer mapping/de-mapping, precoding, RE mapping/de-mapping, FFTs/IFFTs, and DFTs/IDFTs. PDCP functions include security ciphering, header compression and decompression, sequence numbering and re-sequencing, de-duplication. SDAP functions include QoS marking and flow control. RRC functions include authentication, security, handover control, status reporting, QoS, network broadcasts and pages, and network selection.

Figure 8:
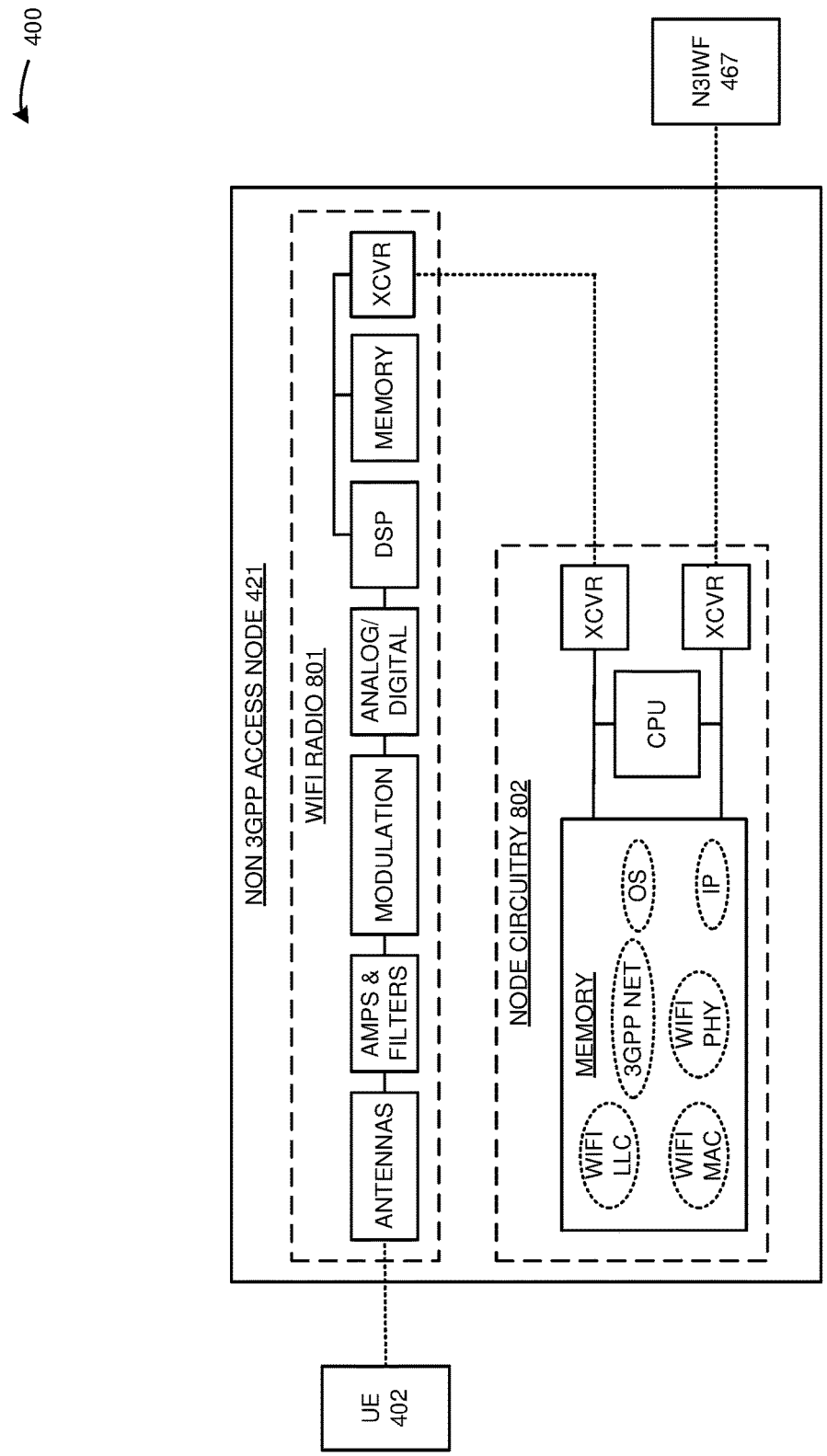
FIG. 8 illustrates a non-3GPP Access Network (AN) in the 5G communication network.

FIG. 8 illustrates non-3GPP access node 421 in 5G communication network 400. Non-3GPP access node 421 comprises an example of the RAN illustrated in FIG. 1, although the RAN illustrated in FIG. 1 may differ from this example. Non-3GPP access node 421 comprises WIFI radio 801 and node circuitry 802. Non-3GPP access node 421 may comprise a trusted access node or an untrusted access node. WIFI radio 801 comprises antennas, amplifiers, filters, modulation, analog-to-digital interfaces, DSP, memory, and transceivers that are coupled over bus circuitry. Node circuitry 802 comprises memory, CPU, and transceivers that are coupled over bus circuitry. The memory in node circuitry 802 stores operating systems and network applications like WIFI PHY, WIFI MAC, WIFI LLC, IP, and 3GPP Networking (NET). Other wireless protocols like bluetooth and narrowband internet-of-things could be used.

The antennas in WIFI radio 801 are wirelessly coupled to UE 402 over non-3GPP wireless links. Transceivers in WIFI radio 801 are coupled to transceivers in node circuitry 802. Transceivers in node circuitry 802 are coupled to transceivers in N3IWF 467 over backhaul links. The CPU in node circuitry 802 executes the operating system and network applications to exchange data and authentication signaling with UE 402.

Figure 9:
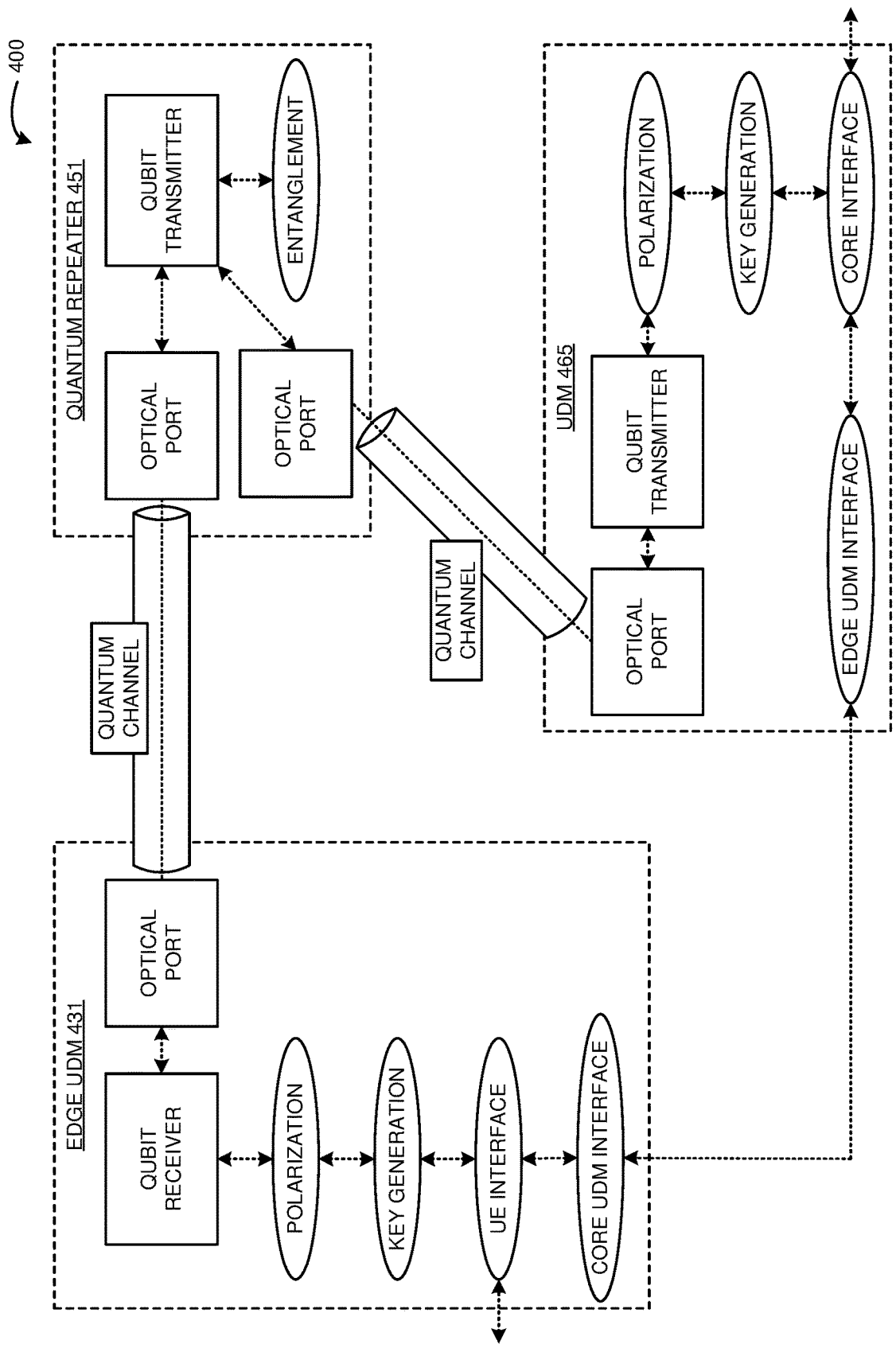
FIG. 9 illustrates quantum authentication interfaces in the 5G communication network.

FIG. 9 illustrates edge UDM 431, quantum repeater 451, and UDM 465 in 5G communication network 400. Edge UDM 431 comprises an example of edge quantum circuitry 112, however edge quantum circuitry 112 may differ. UDM 465 comprises an example of network quantum circuitry 133, however network quantum circuitry 133 may differ. Quantum repeater 451 and the quantum channels comprise an example of quantum network 121, however quantum network 121 may differ. Edge UDM 431 comprises an optical port, qubit receiver, and network applications for polarization, key generation, UE interfacing, and UDM interfacing. Edge UDM 441 may be similar to edge UDM 431. Quantum repeater 451 comprises optical ports, a qubit transmitter, and a network application for qubit entanglement. Qubit repeater 452 may be similar to qubit repeater 451. The quantum channels comprise optical links, vacuums, metallic links, and/or other types of links that can transmit quantum information. UDM 465 comprises an optical port, a qubit transmitter, and network applications for polarization, key generation, UDM interfacing, and core interfacing.

In UDM 465 and edge UDM 431, the UDM interfaces exchange authentication requests to initiate QKD procedures and authentication information for key generation over secure communication channels. The UDM interfaces may encrypt/decrypt and transfer information using Fifth Generation Core (5GC) communication protocols between edge UDM 431 and UDM 465. The key generation applications generate quantum derived authentication keys for UE 401 based on the polarization states of the qubits. The polarization application in UDM 465 select polarization bases for the qubit transmitter. The polarization application in edge UDM 431 selects measurement bases for the qubit receiver. The core interface application in UDM 465 exchanges authentication keys for UE 401 and network data with other network functions in 5G core 460. The UE interface in edge UDM 431 receives authentication requests from UE 401 and transfers quantum derived keys to UE 401. The entanglement application in quantum repeater 451 entangles qubits resident in quantum repeater 451 with qubits received from UDM 465 to transfer the polarization states from the received qubits to the resident qubits.

In UDM 465, the qubit transmitter generates and polarizes the qubits using the indicated polarization bases from the polarization application. The optical port couples to the quantum channel and transfers the polarized qubits to quantum repeater 451. The qubit transmitter in qubit repeater 451 entangles the received qubits from UDM 465 with the resident qubits based on entanglement instructions from the entanglement application. The optical port in quantum repeater 451 transfers the entangled resident qubits to the optical port in edge UDM 431 over the quantum channel. The qubit receiver in edge UDM 431 determines the polarizations of the qubits received from qubit repeater 451 using the measurement bases indicated by the polarization application.

The UDM interfaces in edge UDM 431 and UDM 465 exchange the polarization states determined by the qubit receiver and the polarization states that the UDM 465 encoded the qubits with. The key generation applications compare the determined polarization states with the encoded polarization states. The polarization applications identify qubits that have a determined polarization state that is the same as the encoded polarization state. Typically, around 50% of the qubits will have determined polarization states that match the encoded polarization states. The key generation applications generate an authentication key based on the qubits with matching polarization states. The UE interface in edge UDM 431 transfers the authentication key to UE 401. The core interface in UDM 465 transfers the authentication key upon request to other network functions like AUSF 464.

Figure 10:
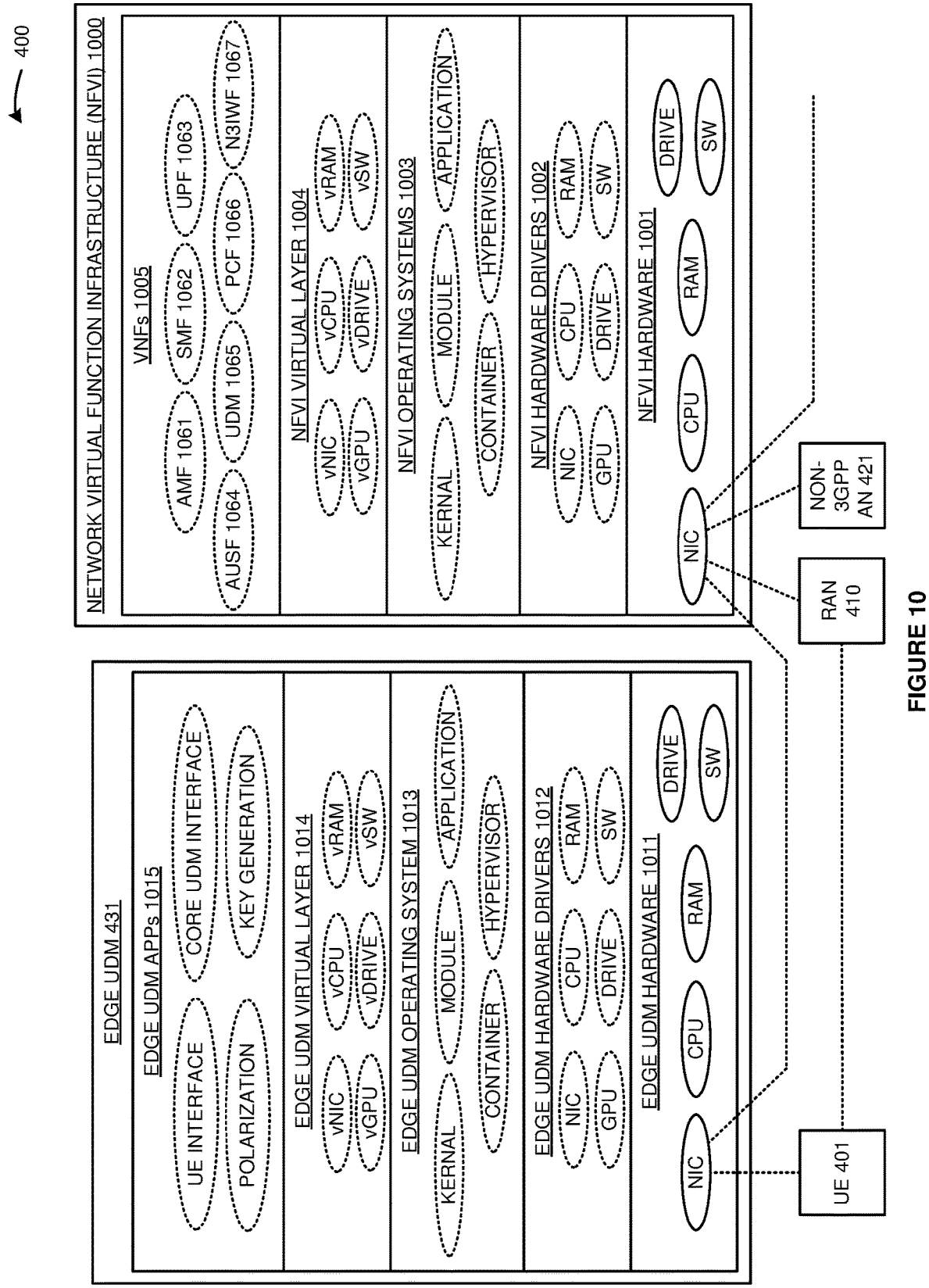
FIG. 10 illustrates a Network Function Virtualization Infrastructure (NFVI) in the 5G communication network.

FIG. 10 illustrates Network Function Virtualization Infrastructure (NFVI) 1000 and edge UDM 431 in 5G communication network 400. NFVI 1000 comprises an example of network data system 131, although network data system 131 may vary from this example. Edge UDM 431 comprises an example of edge quantum circuitry 112, although edge quantum circuitry 112 may differ. NFVI 1000 comprises NFVI hardware 1001, NFVI hardware drivers 1002, NFVI operating systems 1003, NFVI virtual layer 1004, and NFVI Virtual Network Functions (VNFs) 1005. NFVI hardware 1001 comprises Network Interface Cards (NICs), CPU, GPU, RAM, Flash/Disk Drives (DRIVE), and Data Switches (SW). NFVI hardware drivers 1002 comprise software that is resident in the NIC, CPU, GPU, RAM, DRIVE, and SW. NFVI operating systems 1003 comprise kernels, modules, applications, containers, hypervisors, and the like. NFVI virtual layer 1004 comprises vNIC, vCPU, vGPU, vRAM, vDRIVE, and vSW. NFVI VNFs 1005 comprise AMF 1061, SMF 1062, UPF 1063, AUSF 1064, UDM 1065, PCF 1066, and N3IWF 1067. Additional VNFs and network elements like Network Slice Selection Function (NSSF), Unified Data Registry (UDR), and Network Exposure Function (NEF) are typically present but are omitted for clarity. NFVI 1000 may be located at a single site or be distributed across multiple geographic locations. The NIC in NFVI hardware 1001 is coupled to 5G RAN 410, to non-3GPP AN 421, to a NIC in edge UDM hardware 1011, and to external systems. NFVI hardware 1001 executes NFVI hardware drivers 1002, NFVI operating systems 1003, NFVI virtual layer 1004, and NFVI VNFs 1005 to form AMF 461, SMF 462, UPF 463, AUSF 464, UDM 465, PCF 466, and N3IWF 467.

Edge UDM 431 comprises edge UDM hardware 1011, edge UDM hardware drivers 1012, edge UDM operating systems 1013, edge UDM virtual layer 1014, and edge UDM applications (APPs) 1015. Edge UDM 441 may comprise similar architecture to edge UDM 431, however edge UDM 441 may differ. Edge UDM hardware 1011 comprises NICs, CPU, GPU, RAM, DRIVE, and SW. Edge UDM hardware drivers 1012 comprise software that is resident in the NIC, CPU, GPU, RAM, DRIVE, and SW. Edge UDM operating systems 1013 comprise kernels, modules, applications, containers, hypervisors, and the like. Edge UDM virtual layer 1014 comprises vNIC, vCPU, vGPU, vRAM, vDRIVE, and vSW. Edge UDM applications 1015 comprise applications for UE interfacing, core UDM interfacing, polarization, and key generation. Edge UDM 431 may be located at a single site or be distributed across multiple geographic locations. The NIC in edge UDM hardware 1011 is coupled to UE 401 and to a NIC in NFVI hardware 1001. Edge UDM hardware 1011 executes edge UDM hardware drivers 1012, edge UDM operating systems 1013, edge UDM virtual layer 1014, and edge UDM applications 1015 to form the UE interfacing, core UDM interfacing, polarization, and key generation applications.

Figure 11:
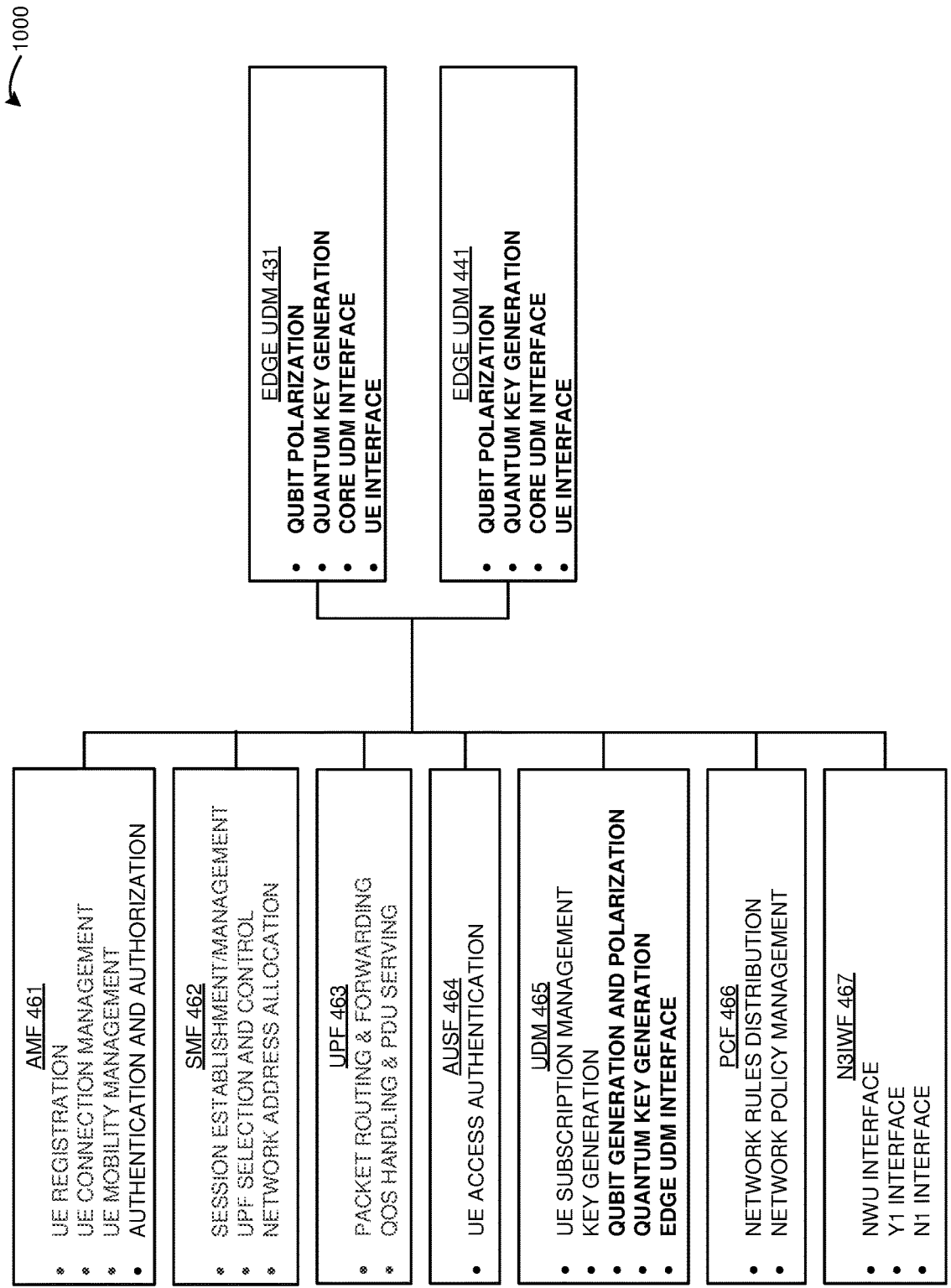
FIG. 11 further illustrates the NFVI in the 5G communication networks.

FIG. 11 further illustrates NFVI 1000, edge UDM 431, and edge UDM 441 in 5G communication network 400. AMF 461 performs UE registration, UE connection/mobility management, and UE authentication and authorization. SMF 462 performs session establishment and management, UPF selection and control, and network address allocation. UPF 463 performs packet routing & forwarding, QoS handling, and PDU interconnection and serving. AUSF performs UE access authentication. UDM 465 performs UE subscription management, key generation, qubit generation and polarization, quantum key generation, and edge UDM interfacing. PCF 466 performs network policy management and network rules distribution. N3IWF 467 performs NWu interfacing, Y1 interfacing, and N1 interfacing. Edge UDMs 431 and 441 perform qubit generation and polarization, quantum key generation and distribution, UE interfacing, and core UDM interfacing.

In this example, non-3GPP UE 402 is manufactured at manufacturing system 440 and edge UDM 441 and UDM 465 interact to generate a quantum authentication key for UE 402, however the operation may differ in other examples. In operation, manufacturing system 440 manufactures UE 402. UE 402 detachably couples to edge UDM 441 over a secure wired connection. UE 402 transfers an identity code to edge UDM 441 to authenticate itself. In response to the authentication, edge UDM 441 initiates a QKD procedure with UDM 465. Edge UDM 441 transfers a manufacturing notification that indicates UE 402 to UDM 465. UDM 465 generates qubits for edge UDM 441. UDM 465 selects a polarization bases for the qubits and polarizes the qubits according to their selected polarization bases. For example, UDM 465 may vertically polarize a first qubit, vertically polarize a second qubit, and horizontally polarize a third qubit. UDM 465 typically generates and polarizes many more qubits than in the example. UDM 465 transfers the polarized qubits to quantum repeater 452 over a quantum channel. Quantum repeater 452 entangles the received qubits with qubits resident in quantum repeater 452. The entanglement process transfers the polarization states of the received qubits to the resident qubits. Once entangled, qubit repeater 452 transfers the entangled resident qubits to edge UDM 441 over a quantum channel.

Edge UDM 441 selects a measurement bases for the qubits received from qubit repeater 452. Edge UDM 441 determines the polarizations of the received qubits using the corresponding measurement basis for the qubits. For example, edge UDM 441 may determine the polarization of a first qubit using a rectilinear measurement basis and determine the polarization of a second qubit using a diagonal measurement basis. The determined polarizations differ based on the measurement basis used. Edge UDM 441 indicates the determined polarizations of the received qubits to UDM 465. UDM 465 indicates the selected polarizations to edge UDM 441. UDM 465 and edge UDM 441 generate a quantum derived authentication key for UE 402 based on the determined polarizations and the selected polarizations for the qubits. Edge UDM 441 transfers its copy of the quantum derived key to UE 402. UDM 465 securely stores its copy of the quantum derived key. UE 402 securely stores the quantum derived key received from edge UDM 441. UE 402 is detached from edge UDM 441 and is moved to another location.

N3IWF 467 receives a registration request for UE 402 from non-3GPP AN 421. N3IWF forwards the registration request to AMF 461. AMF 461 transfers an identity request to UE 402 over N3IWF 467 and non-3GPP AN 421. AMF 461 receives an identity indication from UE 402 over non-3GPP AN 421 and N3IWF 467. AMF 461 processes the identity indication and responsively selects AUSF 464 to authenticate UE 402 for wireless services. AMF 461 transfers an authentication request that indicates the identity of UE 402 to AUSF 464. AUSF 464 receives the authentication request and selects UDM 465 to authenticate UE 402. AUSF 464 requests authentication keys for UE 402 from UDM 465. UDM 465 transfers authentication data and the quantum derived authentication key for UE 402 to AUSF 464. AUSF 464 uses the quantum derived authentication key and a random number to generate an expected result for UE 402. AUSF 464 transfers the expected result and the random number to AMF 461. AMF 461 indicates the random number to UE 402 over N3IWF 467 and non-3GPP AN 421. AMF 461 receives the same expected result from UE 402 over N3IWF 467 and non-3GPP AN 421. AMF 461 matches the expected result from AUSF 464 with the expected result from UE 402 to authenticate the identity of UE 402.

Responsive to the authentication and authorization, AMF 461 retrieves UE context for UE 402 from UDM 465. AMF 461 retrieves service policies for UE 402 from PCF 466. AMF 461 selects SMF 462 to establish a PDU session for UE 402 based on the UE context and the service policies. SMF 462 selects UPF 463 to establish the PDU session for UE 402. SMF 462 transfers session context for the PDU session to AMF 461. AMF 461 transfers the session context to UE 402 over N3IWF 467 and non-3GPP AN 421. UPF 463 exchanges user data with UE 402 over N3IWF 467 and non-3GPP AN 421.

Figure 12:
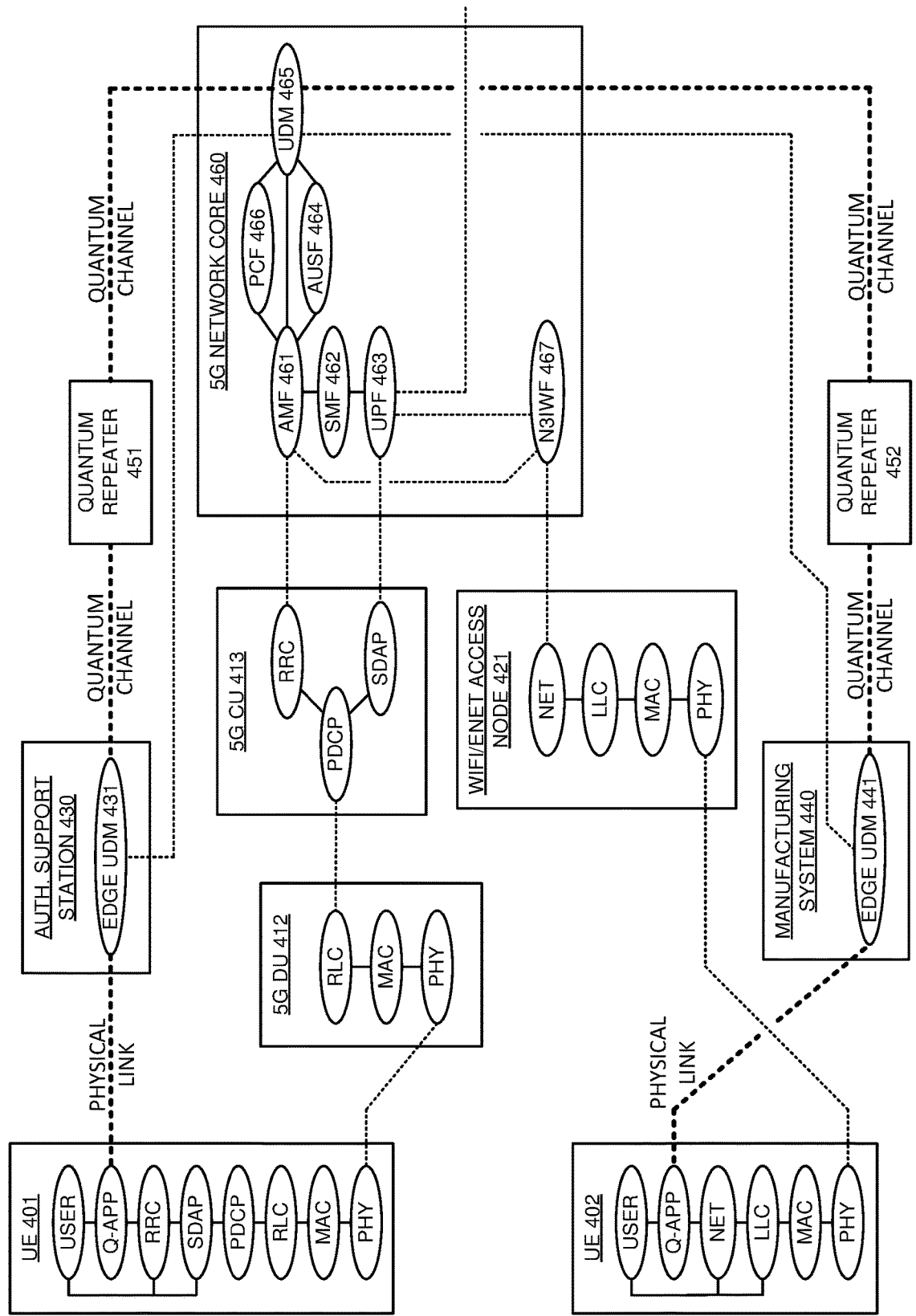
FIG. 12 illustrates an exemplary operation of the 5G communication network to perform quantum authentication for the UEs.

FIG. 12 illustrates an exemplary operation of 5G communication network 400 to perform quantum authentication for 3GPP UE 401. The operation may vary in other examples. In this example, UE 401 is purchased at authentication support station 430 and edge UDM 431 interacts with UDM 465 to generate a quantum authentication key for UE 401, however operation may differ in other examples.

In operation, a user purchases UE 401 at authentication support station 430. In response to the purchase, UE 401 couples to edge UDM 431. The RRC in UE 401 transfers an identity code to edge UDM 431 to authenticate itself. In response to the authentication, edge UDM 431 initiates a QKD procedure with UDM 465. Edge UDM 431 transfers a purchase notification to UDM 465 that indicates UE 401. UDM 465 generates entangled pairs of qubits for edge UDM 431. UDM 465 polarizes the entangled pairs of qubits according to the selected polarization basis for individual pairs of the qubits. UDM 465 transfers a polarized qubit from each entangle pair to quantum repeater 451 over a quantum channel. Quantum repeater 451 receives the qubits from UDM 465. Quantum repeater 451 entangles the qubits received from UDM 465 with qubits resident in quantum repeater to transfer the polarization states from the received qubits to the resident qubits. Quantum repeater 451 transfers the entangled resident qubits to edge UDM 431.

Edge UDM 431 selects a measurement basis for each of the individual qubits received from quantum repeater 451. Edge UDM 431 determines the polarizations of the received qubits using the selected measurement bases for each of the received qubits. Edge UDM 431 indicates the determined polarizations of the received qubits to UDM 465. UDM 465 indicates the polarizations it selected for each of the transferred qubits to edge UDM 431. Edge UDM 431 and UDM 465 generate a quantum derived authentication key for UE 401 based on the determined polarizations and selected polarizations of the qubits. Edge UDM 431 transfers the quantum authentication key to the Q-APP in UE 401. UDM 465 securely stores the quantum authentication key for UE 401. The Q-APP securely stores the quantum authentication key. UE 401 detaches from edge UDM 431 and moves to another location.

At the other location, a user application in UE 401 executes. In response, the RRC in UE 401 wirelessly attaches to the RRC in CU 413 and transfers attachment signaling to the RRC in CU 413 over the PDCPs, RLCs, MACs, and PHYs. The RRC in CU 413 establishes a Radio Resource Control (RRC) connection with the RRC in UE 401 over the PDCPs, RLCs, MACs, and PHYs. The RRC in CU 413 transfers a registration request for UE 401 to AMF 461. AMF 461 transfers an identity request for UE 401 to the RRC in CU 413. The RRC in CU 413 forwards the identity request to the RRC in UE 401 over the PDCPs, RLCs, MACs, and PHYs. In response, the RRC in UE 401 indicates its identity to the RRC in CU 413 over the PDCPs, RLCs, MACs, and PHYs. The RRC in CU 413 forwards the indication to AMF 461. AMF 461 identifies UE 401 and selects AUSF 464 to authenticate UE 401. AMF 461 transfers an authentication request for UE 401 to AUSF 464.

AUSF 464 selects UDM 465 to authenticate UE 401. AUSF 464 retrieves the quantum authentication key for UE 401 from UDM 465. AUSF 464 generates an expected result for UE 401 using the quantum authentication key and a random number. AUSF 464 transfers the expected result and the random number to AMF 461. AMF 461 stores the expected result from AUSF 464 and transfers indicates the random number to the RRC in CU 413. The RRC in CU 413 forwards the indication to the RRC in UE 401 over the PDCPs, RLCs, MACs, and PHYs. The RRC in UE 401 transfers the random number to the Q-APP. The Q-APP hashes the quantum authentication key and the random number to generate the same expected result. The Q-APP transfers the expected result to the RRC. The RRC in UE 401 transfers the expected result to the RRC in CU 413 over the PDCPs, RLCs, MACs, and PHYs. The RRC in CU 413 forwards the expected result to AMF 461. AMF 461 matches the expected result from UE 401 with expected result from AUSF 464 to authenticate the identity of UE 401.

Responsive to the authentication and authorization, AMF 461 retrieves UE context for UE 401 from UDM 465 and retrieves service policies for UE 401 from PCF 466. AMF 461 selects SMF 462 to establish a PDU session for UE 401 based on the UE context and the service policies. SMF 462 selects UPF 463 to establish the PDU session for UE 401 based on the UE context. SMF 462 transfers session context for the PDU session to AMF 461. AMF 461 transfers the session context to the RRC in CU 413. The RRC in CU 413 forwards the session context to the RRC in UE 401 over the PDCPs, RLCs, MACs, and PHYs. The RRC in UE 401 directs the SDAP to use the context to initiate the PDU session. The SDAP in UE 401 exchanges user data with the SDAP in CU 413 over the PDCPs, RLCs, MACs, and PHYs. The SDAP in CU 413 exchanges user data with UPF 463. UPF 463 exchanges the user data with external systems.

The wireless data network circuitry described above comprises computer hardware and software that form special-purpose network circuitry to perform quantum authentication for 3GPP and non-3GPP UEs. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to perform quantum authentication for 3GPP and non-3GPP UEs.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to perform quantum authentication for a wireless User Equipment (UE), the method comprising:
   network quantum circuitry selecting polarization states for qubits, generating and transferring qubits, exchanging cryptography information with edge quantum circuitry, generating cryptography keys based on polarization states and cryptography information, and transferring the cryptography keys to network authentication circuitry;
   the edge quantum circuitry receiving and processing the qubits, determining the polarization states for the qubits, exchanging the cryptography information with the network quantum circuitry, generating the cryptography keys based on the polarization states and cryptography information, and transferring the cryptography keys to the wireless UE, wherein the wireless UE generates authentication data based on the cryptography keys and wirelessly transfers the authentication data for delivery to the network authentication circuitry; and
   the network authentication circuitry receiving the cryptography keys and the authentication data and responsively authenticating the wireless UE based on the cryptography keys and the authentication data.

2. The method of claim 1 further comprising the edge quantum circuitry receiving an authentication request for the wireless UE and responsively notifying the network quantum circuitry and wherein the network quantum circuitry selecting the polarization states, generating and transferring the qubits, exchanging the cryptography information, generating the cryptography keys, and transferring the cryptography keys comprises selecting polarization states, generating and transferring the qubits, exchanging the cryptography information, generating the cryptography keys, and transferring the cryptography keys in response to the authentication notification from the edge quantum circuitry.

3. The method of claim 1 further comprising the edge quantum circuitry receiving a purchase request for the wireless UE and responsively notifying the network quantum circuitry and wherein the network quantum circuitry selecting the polarization states, generating and transferring the qubits, exchanging the cryptography information, generating the cryptography keys, and transferring the cryptography keys comprises selecting polarization states, generating and transferring the qubits, exchanging the cryptography information, generating the cryptography keys, and transferring the cryptography keys in response to the purchase notification from the edge quantum circuitry.

4. The method of claim 1 further comprising the edge quantum circuitry receiving a manufacturing notice for the wireless UE and responsively notifying the network quantum circuitry and wherein the network quantum circuitry selecting the polarization states, generating and transferring the qubits, exchanging the cryptography information, generating the cryptography keys, and transferring the cryptography keys comprises selecting polarization states, generating and transferring the qubits, exchanging the cryptography information, generating the cryptography keys, and transferring the cryptography keys in response to the manufacturing notification from the edge quantum circuitry.

5. The method of claim 1 wherein the edge quantum circuitry transferring the cryptography keys to the wireless UE comprises transferring the cryptography keys to the wireless UE over a metallic cable or a glass fiber.

6. The method of claim 1 wherein:
the edge quantum circuitry comprises an edge Unified Data Management (UDM); and
the network quantum circuitry comprises a core UDM.

7. The method of claim 1 wherein the network authentication circuitry comprises an Access and Mobility Management Function (AMF), an Authentication Server Function (AUSF), and a Unified Data Management (UDM).

8. The method of claim 1 wherein the network quantum circuitry transferring the qubits and the edge quantum circuitry receiving the qubits comprises the network quantum circuitry transferring the qubits to the edge quantum circuitry over a physical distance that exceeds at least ten miles.

9. The method of claim 1 wherein:
the network quantum circuitry transferring the qubits comprises transferring the qubits over an optical quantum network; and
the edge quantum circuitry receiving the qubits comprises receiving the qubits over the optical quantum network.

10. The method of claim 1 wherein:
the network quantum circuitry transferring the qubits comprises transferring the qubits over an optical interface to a quantum repeater that processes and transfers the qubits to the edge quantum circuitry over another optical interface; and
the edge quantum circuitry receiving the qubits comprises receiving the qubits from the quantum repeater over the other optical interface.

11. A wireless communication network configured to perform quantum authentication for a wireless User Equipment (UE), the wireless communication network comprising:
network quantum circuitry configured to select polarization states for qubits, generate and transfer the qubits, exchange cryptography information with edge quantum circuitry, generate cryptography keys based on polarization states and cryptography information, and transfer the cryptography keys to network authentication circuitry;
the edge quantum circuitry configured to receive and process the qubits, determine the polarization states for the qubits, exchange the cryptography information with the network quantum circuitry, generate the cryptography keys based on the polarization states and cryptography information, and transfer the cryptography keys to the wireless UE, wherein the wireless UE generates authentication data based on the cryptography keys and wirelessly transfers the authentication data for delivery to the network authentication circuitry; and
the network authentication circuitry configured to receive the cryptography keys and the authentication data and responsively authenticate the wireless UE based on the cryptography keys and the authentication data.

12. The wireless communication network of claim 11 further comprising the edge quantum circuitry configured to receive an authentication request for the wireless UE and responsively notify the network quantum circuitry and wherein the network quantum circuitry is configured to select the polarization states, generate and transfer the qubits, exchange the cryptography information, generate the cryptography keys, and transfer the cryptography keys comprises the network quantum circuitry configured to select the polarization states, generate and transfer the qubits, exchange the cryptography information, generate the cryptography keys, and transfer the cryptography keys in response to the authentication notification from the edge quantum circuitry.

13. The wireless communication network of claim 11 further comprising the edge quantum circuitry configured to receive a purchase request for the wireless UE and responsively notify the network quantum circuitry and wherein the network quantum circuitry is configured to select the polarization states, generate and transfer the qubits, exchange the cryptography information, generate the cryptography keys, and transfer the cryptography keys comprises the network quantum circuitry configured to select the polarization states, generate and transfer the qubits, exchange the cryptography information, generate the cryptography keys, and transfer the cryptography keys in response to the purchase notification from the edge quantum circuitry.

14. The wireless communication network of claim 11 further comprising the edge quantum circuitry configured to receive a manufacturing notice for the wireless UE and responsively notify the network quantum circuitry and wherein the network quantum circuitry is configured to select the polarization states, generate and transfer the qubits, exchange the cryptography information, generate the cryptography keys, and transfer the cryptography keys comprises the network quantum circuitry configured to select the polarization states, generate and transfer the qubits, exchange the cryptography information, generate the cryptography keys, and transfer the cryptography keys in response to the manufacturing notification from the edge quantum circuitry.

15. The wireless communication network of claim 11 wherein the edge quantum circuitry is configured to transfer the cryptography keys to the wireless UE comprises the edge quantum circuitry configured to transfer the cryptography keys to the wireless UE over a metallic cable or a glass fiber.

16. The wireless communication network of claim 11 wherein:
the edge quantum circuitry comprises an edge Unified Data Management (UDM); and
the network quantum circuitry comprises a core UDM.

17. The wireless communication network of claim 11 wherein the network authentication circuitry comprises an Access and Mobility Management Function (AMF), an Authentication Server Function (AUSF), and a Unified Data Management (UDM).

18. The wireless communication network of claim 11 wherein the network quantum circuitry is configured to transfer the qubits and the edge quantum circuitry is configured to receive the qubits comprises the network quantum circuitry configured to transfer the qubits to the edge quantum circuitry over a physical distance that exceeds at least ten miles.

19. The wireless communication network of claim 11 wherein:
- the network quantum circuitry is configured to transfer the qubits comprises the network quantum circuitry configured to transfer the qubits over an optical quantum network; and
- the edge quantum circuitry is configured to receive the qubits comprises the edge quantum circuitry configured to receive the qubits over the optical quantum network.

20. The wireless communication network of claim 11 wherein:
- the network quantum circuitry is configured to transfer the qubits comprises the network quantum circuitry configured to transfer the qubits over an optical interface to a quantum repeater that processes and transfers the qubits to the edge quantum circuitry over another optical interface; and
- the edge quantum circuitry is configured to receive the qubits comprises the edge quantum circuitry configured to receive the qubits from the quantum repeater over the other optical interface.

* * * * *